US012136366B2

(12) United States Patent
Ikeda et al.

(10) Patent No.: US 12,136,366 B2
(45) Date of Patent: Nov. 5, 2024

(54) IMAGE VIBRATION COMPENSATION FOR VEHICLE DISPLAY DEVICE

(71) Applicant: SONY GROUP CORPORATION, Tokyo (JP)

(72) Inventors: Tetsuo Ikeda, Tokyo (JP); Sachiko Nishide, Tokyo (JP); Miyuki Shirakawa, Tokyo (JP); Tomonari Murakami, Tokyo (JP); Koji Nagata, Tokyo (JP); Maho Hayashi, Tokyo (JP); Seishi Tomonaga, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 130 days.

(21) Appl. No.: 17/760,460

(22) PCT Filed: Feb. 12, 2021

(86) PCT No.: PCT/JP2021/005238
§ 371 (c)(1),
(2) Date: Aug. 10, 2022

(87) PCT Pub. No.: WO2021/166801
PCT Pub. Date: Aug. 26, 2021

(65) Prior Publication Data
US 2023/0093446 A1    Mar. 23, 2023

(30) Foreign Application Priority Data
Feb. 20, 2020    (JP) ................ 2020-027200

(51) Int. Cl.
*G09G 3/00*    (2006.01)
*G06F 3/01*    (2006.01)

(52) U.S. Cl.
CPC ............... *G09G 3/001* (2013.01); *G06F 3/01* (2013.01); *G09G 2320/0626* (2013.01); *G09G 2354/00* (2013.01); *G09G 2380/10* (2013.01)

(58) Field of Classification Search
None
See application file for complete search history.

(56) References Cited

U.S. PATENT DOCUMENTS

| 10,242,457 B1 * | 3/2019 | Sibley | ................ H04N 9/3182 |
| 2011/0141066 A1 * | 6/2011 | Shimotani | ........... G06F 3/04886 345/177 |

(Continued)

FOREIGN PATENT DOCUMENTS

| JP | 09-009179 A | 1/1997 |
| JP | 2003-189219 A | 7/2003 |

(Continued)

OTHER PUBLICATIONS

International Search Report and Written Opinion of PCT Application No. PCT/JP2021/005238, issued on Apr. 13, 2021, 12 pages of ISRWO.

*Primary Examiner* — Edward Martello
(74) *Attorney, Agent, or Firm* — CHIP LAW GROUP

(57) ABSTRACT

The present technique relates to an information processing device, an information processing method, and a program such that information with high usability can be presented. As a parameter related to presentation information to be presented in a vehicle interior of a vehicle, at least one of parameters of brightness, blur, area, and transparency is changed on the basis of vibration information. The present technology can be applied as a projection device placed in a vehicle interior of a vehicle.

19 Claims, 34 Drawing Sheets

(56) References Cited

U.S. PATENT DOCUMENTS

| | | | |
|---|---|---|---|
| 2019/0025580 A1* | 1/2019 | Nagano | G02B 27/0101 |
| 2019/0121522 A1* | 4/2019 | Davis | G06V 40/28 |
| 2020/0124849 A1* | 4/2020 | Tsuji | G06F 3/1454 |

FOREIGN PATENT DOCUMENTS

| | | | |
|---|---|---|---|
| JP | 2006-035980 A | 2/2006 | |
| JP | 2006-040055 A | 2/2006 | |
| JP | 2008-299241 A | 12/2008 | |
| JP | 2011-028633 A | 2/2011 | |
| JP | 2017-013590 A | 1/2017 | |
| JP | 2018-076027 A | 5/2018 | |
| JP | 2019-110373 A | 7/2019 | |
| WO | 2010/064389 A1 | 6/2010 | |

* cited by examiner

Fig. 5

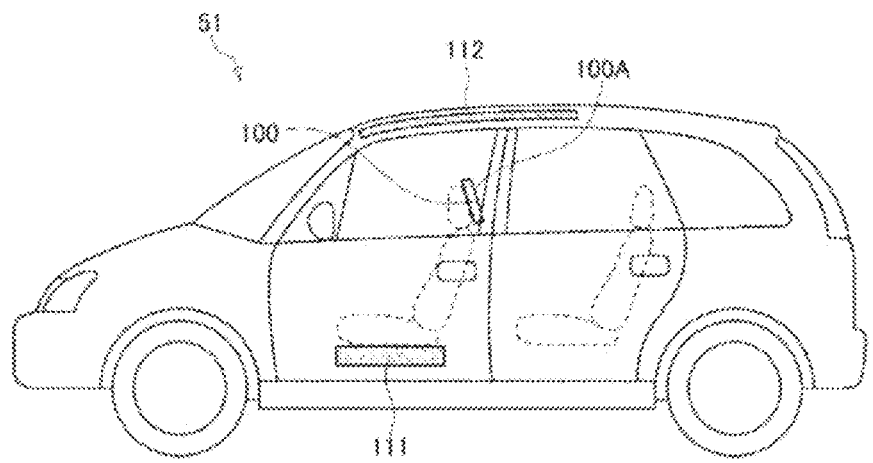

Fig. 6

| SCREEN ID | ATTRIBUTE | ASSUMED NUMBER OF USERS | PROCESSING |
|---|---|---|---|
| #S1 | CEILING | FOUR PERSONS | LOWERING BRIGHTNESS |
| #S2 | CEILING | FOUR PERSONS | APPLYING BLUR |
| #S3 | CEILING | FOUR PERSONS | REDUCING AREA |
| #S4 | CEILING | FOUR PERSONS | CHANGING TRANSPARENCY |
| #S5 | HEADREST | ONE PERSON | DOING NOTHING |
| #S6 | HEADREST | ONE PERSON | LOWERING BRIGHTNESS |
| #S7 | WINDOW | ONE PERSON | PERFORMING PARALLEL MOVEMENT IN ACCORDANCE WITH GUI PARTS |

Fig. 7

| USER ID | ATTRIBUTE | USER PROPERTY VALUES USED BY INFORMATION PRESENTATION UNIT | | | |
|---|---|---|---|---|---|
| | | BRIGHTNESS | BLUR | AREA | TRANSPARENCY |
| #U1 | JAPANESE/ADULT/ REAR SEAT | 75% | 5px | 75% | 25% |
| #U2 | JAPANESE/CHILD/ REAR SEAT | 50% | 10px | 50% | 50% |
| #U3 | WESTERNER/ADULT/ REAR SEAT | 50% | 10px | 50% | 50% |
| #U4 | JAPANESE/ADULT/ DRIVER'S SEAT | 100% | 0px | 100% | 25% |
| #U5 | JAPANESE/ADULT/ FRONT PASSENGER SEAT | 75% | 5px | 75% | 25% |

IMAGE VIBRATION COMPENSATION FOR VEHICLE DISPLAY DEVICE

CROSS REFERENCE TO RELATED APPLICATIONS

This application is a U.S. National Phase of International Patent Application No. PCT/JP2021/005238 filed on Feb. 12, 2021, which claims priority benefit of Japanese Patent Application No. JP 2020-027200 filed in the Japan Patent Office on Feb. 20, 2020. Each of the above-referenced applications is hereby incorporated herein by reference in its entirety.

TECHNICAL FIELD

The present technology relates to an information processing device, an information processing method, and a program, and more particularly, to an information processing device, an information processing method, and a program that present information with high usability.

BACKGROUND ART

PTL 1 discloses a technique for displaying an image that is difficult to view due to vibration in a manner in which it can be easily viewed by providing a larger image display region than an actual image display region.

CITATION LIST

Patent Literature

PTL 1

JP H9-9179 A

SUMMARY

Technical Problem

There may be cases in which vibration of a large display image in a vehicle interior of a vehicle such as an automobile leads to carsickness or a bad feeling.

The present technology was made in view of such circumstances and is to prevent a user from suffering from carsickness or a bad feeling even if a display image vibrates.

Solution to Problem

An information processing device or a program according to the present technology is an information processing device including a presentation processing unit that changes, on the basis of vibration information, at least one of parameters of brightness, blur, area, and transparency as a parameter related to presentation information to be presented in a vehicle interior of a vehicle and a program that causes a computer to function as such an information processing device.

An information processing method according to the present technology is an information processing method including, by a processing unit of an information processing device that includes the processing unit, changing, on the basis of vibration information, at least one of parameters of brightness, blur, area, and transparency as a parameter related to presentation information to be presented in a vehicle interior of a vehicle.

According to the present technology, at least one of parameters of brightness, blur, area, and transparency is changed, on the basis of vibration information, as a parameter related to presentation information to be presented in a vehicle interior of the vehicle.

BRIEF DESCRIPTION OF DRAWINGS

FIG. 5 is a diagram for explaining a vibration model.

FIG. 6 is a diagram illustrating, as an example, a screen property table storing definitions of screen properties.

FIG. 7 is a diagram illustrating, as an example, a user property table storing definitions of user properties.

DESCRIPTION OF EMBODIMENTS

Hereinafter, embodiments of the present technology will be described with reference to the drawings.

<<One Embodiment of Information Processing Device to which Present Technology is Applied>>

Figure 1:
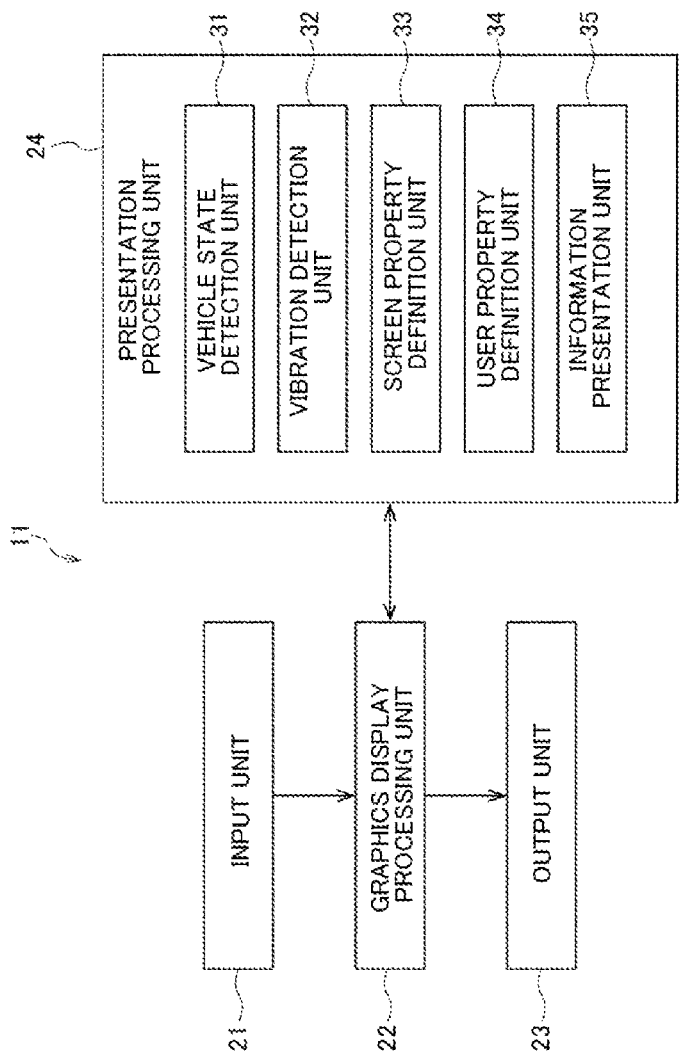
FIG. 1 is a block diagram illustrating a configuration example of an embodiment of an information processing device to which the present technology is applied.

FIG. 1 is a block diagram illustrating a configuration example of an embodiment of an information processing device to which the present technology is applied.

In FIG. 1, an information processing device 11 is a device that displays (projects) presentation information generated by predetermined processing to a predetermined location using a projector or the like in a vehicle interior of an automobile (hereinafter, also referred to as a vehicle), for example.

The presentation information is information generated by processing of an operating system (OS) or a predetermined application (hereinafter, simply referred to as an app). Types of the app (processing) are not limited to specific types and may be a weather forecast app, a music app, a car navigation app, a gourmet app, a video app, a map app, a discussion app, or the like.

The information processing device 11 has an input unit 21, a graphics display processing unit 22, an output unit 23, and a presentation processing unit 24.

The input unit 21 includes a typical input device that receives user's operations and projection surface states as inputs. Specifically, the input unit 21 includes a touch panel, an image sensor, a depth sensor, and a touch sensor.

The depth sensor acquires three-dimensional information such as a user's state and whether the user is gripping the inside. The depth sensor may be a visible light camera, an infrared camera, a stereo camera, a time of flight (ToF) sensor, or the like.

The input unit 21 supplies information received from a user as an input (input information) to the graphics display processing unit 22.

The graphics display processing unit 22 has a function of receiving input information from the input unit 21 and a function of displaying graphics for the user.

Also, the graphics display processing unit 22 functions as a typical OS control layer of controlling depiction of multiple types of content such as a window for displaying applications and distributing operation events such as a touch for each type of content. Note that the content may be any content such as that obtained from recording media, that obtained through communication, and that obtained through inter-vehicle communication.

The graphics display processing unit 22 supplies input information from the input unit 21 to the presentation processing unit 24.

The output unit 23 is an output device that presents information to the user. For example, the output unit 23 includes an image displaying display (a liquid crystal display, an organic electro-luminescence (EL) display, or the like), and a projector (projection device).

The presentation processing unit 24 performs processing related to presentation of presentation information in accordance with vibration of the vehicle. Specifically, the presentation processing unit 24 changes parameters related to presentation information to be presented in the vehicle interior of the vehicle on the basis of vibration information of the vehicle. The vibration information of the vehicle may be whether or not there is vibration of the vehicle that is currently traveling or may be whether or not there is vibration of the vehicle that is expected to be detected in the future. Also, the presentation information is assumed to include a content image and GUI parts as well as a display image (projection image), which will be described later.

The presentation processing unit 24 has a vehicle state detection unit 31, a vibration detection unit 32, a screen property definition unit 33, a user property definition unit 34, and an information presentation unit 35.

The vehicle state detection unit 31 detects a speed of a vehicle itself, a state of a road surface, other vehicles traveling in front, and the like. The vehicle state detection unit 31 uses information from the Global Positioning System (GPS, a global positioning satellite), a camera, in-vehicle sensors, and the like.

The vibration detection unit 32 detects vibration of the automobile itself on the basis of information from the in-vehicle sensors such as an acceleration sensor and a gyro sensor. The vibration detection unit 32 may detect vibration of the entire vehicle or may detect vibration of each location of the vehicle, such as a ceiling or a headrest on which the output unit 23 displays information.

The screen property definition unit 33 defines screen IDs, screen attributes, the assumed number of users, and processing when vibration occurs, as screen properties. The screen property definition unit 33 manages (holds) the screen properties in the form of a relational database, a lookup table, or the like.

The user property definition unit 34 defines user IDs, user attributes, and user property values used by the information presentation unit 35 as user properties. The user property definition unit 34 manages (holds) the user properties in the form of a relational database, a lookup table, or the like.

The information presentation unit 35 presents information to the user. The information presentation unit 35 dynamically controls images, videos, instruction threshold values, and the like in response to vibrations of the vehicle itself.

<Concerning Output Unit 23>

An embodiment of the output unit 23 will be described.

Figure 2:
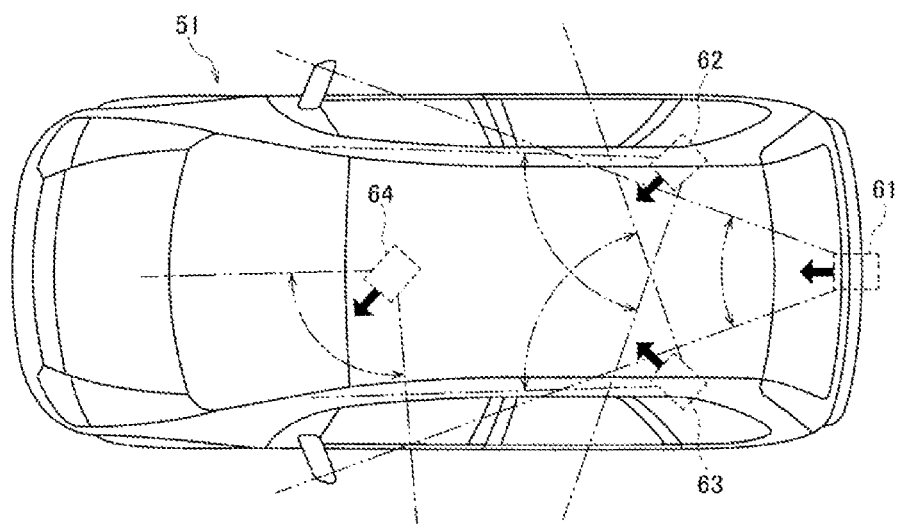
FIG. 2 is a plan view of an automobile 51 to which the present technology is applied.
Figure 3:
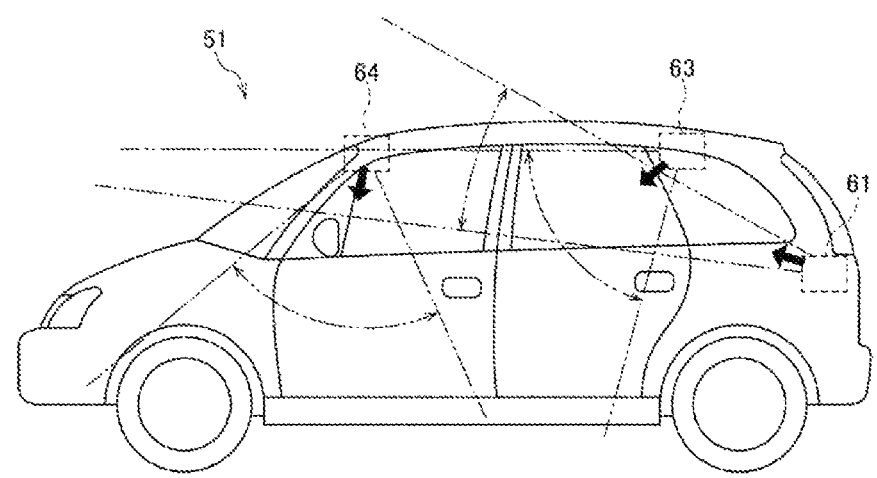
FIG. 3 is a side view of the automobile 51 to which the present technology is applied.

FIGS. 2 and 3 are a plan view and a side view of an automobile 51 to which the present technology is applied.

As illustrated in FIGS. 2 and 3, projectors 61, 62, 63, and 64 are placed in the vehicle interior of the automobile 51 as one form of the output unit 23.

The projector 61 is placed near the center of a rear portion in the vehicle interior in the up-down and left-right directions. The projector 62 is placed at a right side surface upper portion (an upper portion of a C pillar, for example) of the rear portion in the vehicle interior. The projector 63 is placed at a left side surface upper portion (an upper portion of a C pillar, for example) of the rear portion in the vehicle interior. The projector 64 is placed at a front-side portion of the ceiling in the vehicle interior.

Figure 4:
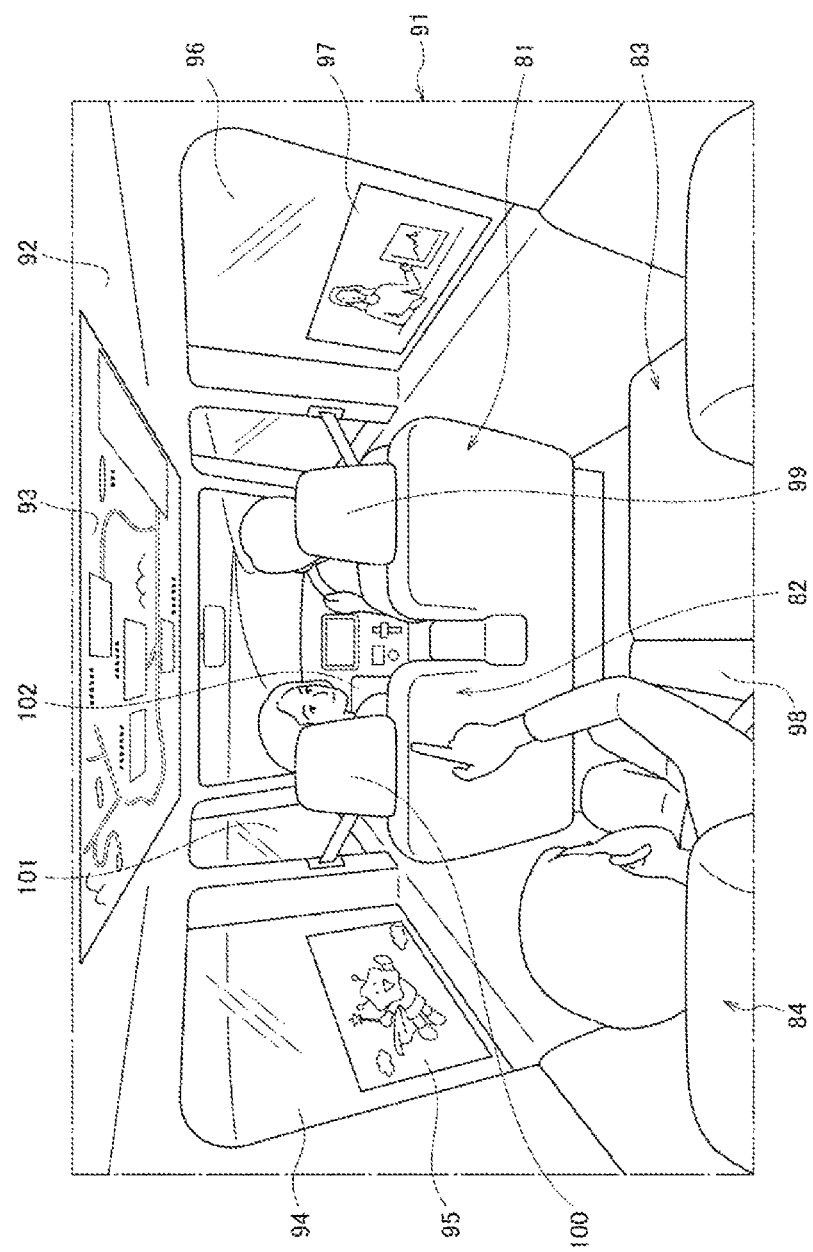
FIG. 4 is a diagram illustrating, as an example, a position to which a projection image from a projector is projected in a vehicle interior 91 of an automobile 51.

FIG. 4 is a diagram illustrating, as an example, a position to which a projection image from a projector is projected in the vehicle interior 91 of the automobile 51.

Examples of a location to which a projection image from a projector is projected (referred to as a display portion where information is displayed (presentation location) or simply a screen) in the vehicle interior 91 of the automobile 51 include the ceiling 92, a left door glass 94 of a rear seat, a right door glass 96 of the rear seat, headrests 99 and 100 of a driver's seat 81 and a front passenger seat 82, a door glass 101 of the front passenger seat 82, a dashboard 102, and the like.

A projection image 93 from the projector 61 in FIG. 2 is projected to the ceiling 92. A projection image 95 from the projector 62 in FIG. 2 is projected to the left door glass 94 of the rear seat. A projection image 97 from the projector 63 in FIG. 2 is projected to the right door glass 96 of the rear seat.

Also, a projection image from the projector 64 in FIG. 2 is projected to the door glass 101 of the front passenger seat 82 and the dashboard 102 where no projection image is illustrated in FIG. 4. A projection image from the projector 61, 62, or 63 in FIG. 2 is displayed on the rear surface side of the headrests 99 and 100 of the driver's seat 81 and the front passenger seat 82.

Note that the projector for projecting a projection image to the ceiling may be placed on headrests 99 and 100 of the driver's seat 81 and the front passenger seat 82 or the headrests of the rear seats 83 and 84, for example. Also, the screens may be provided on the right door glass of the driver's seat 81, a front glass, a rear glass, an armrest, a rear surface of the back seat, and the like and are not limited to specific locations. Locations where the projectors are placed are also not limited to specific locations in the vehicle interior 91.

Also, projection images from the projectors may not be projected to some or all of the screens in the vehicle interior 91 and image display panels (liquid crystal displays, organic EL displays, and the like) may be placed instead as a form of the output unit 23. However, the output unit 23 is assumed to be the projectors in the following description.

Also, the image sensor, the depth sensor, and the like included in the input unit 21 may be placed as a set with the projectors in the vehicle interior.

<Detection of Vibration of Vibration Detection Unit 32>

The vibration detection unit 32 acquires an output value of an in-vehicle sensor capable of detecting vibrations, such as an acceleration sensor or a gyro sensor, for example (hereinafter referred to as a vibration sensor). The vibration detection unit 32 compares the output value of the vibration sensor with a predetermined threshold value.

As a result, in a case in which the output value of the vibration sensor is less than the threshold value, the vibration detection unit 32 determines that the vehicle itself is not vibrating. On the other hand, in a case in which the output value of the vibration sensor is equal to or greater than the threshold value, the vibration detection unit 32 determines that the vehicle itself is vibrating.

The vibration detection unit 32 may detect vibration of the entire vehicle or may detect vibration at each of the positions of the screens, such as the ceiling and the headrests.

As a method for detecting vibration at each of the positions of the screens, there is a method of placing a vibration sensor at each display location when the automobile is manufactured, modeling features of shaking, and acquiring a vibration model. According to the vibration model, it is possible to estimate vibration at positions of other screens from vibration at a position of one screen, and the vibration sensors placed at the screens except for the one are removed before shipping.

FIG. 5 is a diagram for explaining a vibration model.

In the automobile 51 in FIG. 5, a screen 100A is assumed to be a rear surface of the headrest 100 of the front passenger seat 82 and is a location to which an image from a projector is projected.

A screen 112 is assumed to be a part of the ceiling 92 and a location to which an image from a projector is projected.

On the other hand, a damper 111 for reducing vibration is assumed to be placed below the front passenger seat 82 of the automobile 51.

In this case, when the screen 112 on the ceiling 92 largely vibrates, it is possible to estimate that vibration of the screen 100A on the headrest 100 of the front passenger seat 82 is small due to the damper 111 and how large the vibration of the screen 100A is relative to the magnitude of the vibration of the screen 112, using the vibration model.

The vibration detection unit 32 estimates the magnitude of vibration at each display location on the basis of an output value from one vibration sensor and the vibration model acquired in advance. The vibration detection unit 32 then compares the estimated magnitude of vibration at each display location with a threshold value and determines whether or not there is vibration at each display location.

Note that vibration sensors may be incorporated to correspond to all or some of the display locations. In this case, the vibration detection unit 32 acquires output values of the vibration sensors as magnitudes of vibration for the display locations where the corresponding vibration sensors are provided, and the vibration detection unit 32 estimates the magnitudes of vibration from the magnitudes of vibration of other display locations and the vibration model for the display locations where the corresponding vibration sensors are not provided. Also, the vibration detection unit 32 may output the detected or estimated magnitude of vibration, and the determination of whether or not there is vibration may be performed by the information presentation unit 35 or the like.

<Screen Property Definition Unit 33>

The screen property definition unit 33 defines a screen ID, screen attributes, the assumed number of users, and processing when vibration occurs in relation to each display location where information is displayed as screen properties.

FIG. 6 is a diagram illustrating, as an example, a screen property table storing definitions of the screen properties.

The screen property table in FIG. 6 has "screen ID", "attribute", "assumed number of users", and "processing" as items of columns.

Each record (row) in the screen property table has a field for storing data corresponding to an item of its column.

Hereinafter, fields for storing data of the items "screen ID", "attribute", "assumed number of users", and "processing" of each record will be referred to as a "screen ID" field, an "attribute" field, an "assumed number of users" field, and a "processing" field.

Identification data for specifying each display location is stored in the "screen ID" field. In the example in FIG. 6, screen ID #S1 to #S7 are associated with the display locations.

A place (position) of each display location is stored in the "attribute" field. In the example in FIG. 6, the position of the display location with screen IDs #S1 to #S4 is the "ceiling". The position of the display location with screen IDs #S5 and #S6 is the "headrest". The position of the display location with a screen ID #S7 is the "window".

The assumed number of persons using (viewing) information about each display location at the same time is stored in the "assumed number of users" field. In the example in FIG. 6, the assumed number of users of the display location with the screen IDs #S1 to #S4 is "four". The assumed number of users of the display location with the screen IDs #S5 to #S7 is "one".

Processing for changing a parameter related to a display image to be displayed at the display location (a parameter related to presentation information) when vibration of each display location occurs is stored in the "processing" field. In the example in FIG. 6, processing performed on the display location with the screen ID #S1 when vibration occurs is processing of "lowering brightness". Processing on the display location with the screen ID #S2 when vibration occurs is processing of "applying blur (feathering)". Processing on the display location with the screen ID #S3 when vibration occurs is processing of reducing the "area (the area of the display window)". Processing on the display location with the screen ID #S4 when vibration occurs is processing of "changing transparency". Processing on the display location with the screen ID #S5 is processing of "doing nothing". Processing on the display location with the screen ID #S6 when vibration is reproduced is processing of "lowering brightness". Processing on the display location with the screen ID #S7 is processing of "performing parallel movement in accordance with GUI parts".

<User Property Definition Unit 34>

The user property definition unit 34 defines user IDs, user attributes, and user property values (parameters) used by the information presentation unit 35 as user properties.

FIG. 7 is a diagram illustrating, as an example, a user property table storing definitions of the user properties.

The user property table in FIG. 7 has "user ID", "attribute", and "user property value used by information presentation unit" as items of columns. The item in "user property value used by information presentation unit" will be simply referred to as a "user property value" below. Also, the user property table has "brightness", "blur", "area", and "transparency" obtained by subdividing "user property value" as items of the columns.

Each record (row) in the user property table has a field for storing data corresponding to an item of its column.

Hereinafter, fields for storing data of the items "user ID", "attribute", "brightness", "blur", "area", and "transparency" of each record will be referred to as a "user ID" field, an "attribute" field, a "brightness" field, a "blur" field, an "area" field, and a "transparency" field.

Identification data for identifying each user is stored in the "user ID" field. In the example in FIG. 7, user IDs #U1 to #U5 are associated with the users.

Classification of a user's race, classification of an adult or a child, and classification of a seated position are stored in the "attribute" field. In other words, a combination of a race, classification of an adult or a child (adult/child) (classification of an age), and a seated position is an attribute.

The classification of a race is classification based on a residence. In the example in FIG. 7, the classification of the race is limited only to Japanese or westerners, and attributes of the user with the user ID #U1 are "Japanese/adult/rear seat". Attributes of the user with the user ID #U2 are "Japanese/child/rear seat". Attributes of the user with the user ID #U3 are "westerner/adult/rear seat". Attributes of the user with the user ID #U4 are "Japanese/adult/driver's seat". Attributes of the user with the user ID #U5 are "Japanese/adult/front passenger seat".

Note that the attributes of the users illustrated in FIG. 7 are only some of the attributes that can be employed. As attributes of the users, all combinations of the classification of races, classification of an adult or a child, and classification of a seat where one is seated except for attributes of a combination of a child and a driver's seat (Japanese/child/front passenger seat, and the like) are present in addition to the attributes illustrated in FIG. 7.

A value representing how high brightness is after change in a case in which processing performed when vibration occurs is processing of lowering brightness (processing related to brightness) is stored in the "brightness" field of the "user property value" for the display location with the screen IDs #S1 and #S6 in FIG. 6. The value representing how high the brightness is after the change is a value representing how high the brightness of the presentation image is after the change in brightness in terms of percentage in a case in which the maximum value of the brightness of the presentation image to be displayed at the display location is assumed to be 100%. In the example in FIG. 7, brightness for the users with the user IDs #U1 and #U5 is "75%". Brightness for the users with the user IDs #U2 and #U3 is "50%". Brightness of the user with the user ID #U4 is "100%".

The number of pixels to be referred to for each pixel (how many pixels (px) in the surroundings are to be blurred for each pixel) in blurring processing (feathering processing) of the presentation image to be displayed at the display location in a case in which the processing performed when vibration occurs is processing of applying blur (processing related to blur) is stored in the "blur" field of the "user property value" for the display location with the screen ID #S2 in FIG. 6. In the example in FIG. 7, blur for the users with the user IDs #U1 and #U5 is "5 px". Blur for the users with the user IDs #U2 and #U3 is "10 px". Blur for the user with the user ID #U4 is "0 px".

A value representing the size of the area after a change in a case in which processing performed when vibration occurs is processing of reducing the area (processing related to the area) is stored in the "area" field of the "user property value" for the display location with the screen ID #S3 in FIG. 6. The value representing the size of the area after the change is a value representing the size of the area of the presentation image after size reduction in terms of percentage in a case in which the maximum area of the presentation image to be displayed at the display location is assumed to be 100%. In the example in FIG. 7, the area for the users with the user IDs #U1 and #U5 is "75%". The area for the users with the user IDs #U2 and #U3 is "50%". The area for the user with the user ID #U4 is "100%".

A value representing how high transparency after a change is in a case in which the processing performed when vibration occurs is processing of changing transparency (processing related to transparency) is stored in the "transparency" field of the "user property value" for the display location with the screen ID #S4 in FIG. 6. The value representing how high transparency is after the change is a value representing how high transparency of a presentation image is after a change in transparency in terms of percentage in a case in which the maximum transparency (complete transparency) of the presentation image to be displayed at the display location is assumed to be 100%. In the example in FIG. 7, transparency for the users with the user IDs #U1, #U4, and #U5 is "25%". Transparency for the users with the user IDs #U2 and #U3 is "50%".

In this manner, the values of the parameters related to the display image are defined for each of the attributes of the users.

<Example of Information Presentation Processing Performed by Information Processing Device 11>

Figure 8:
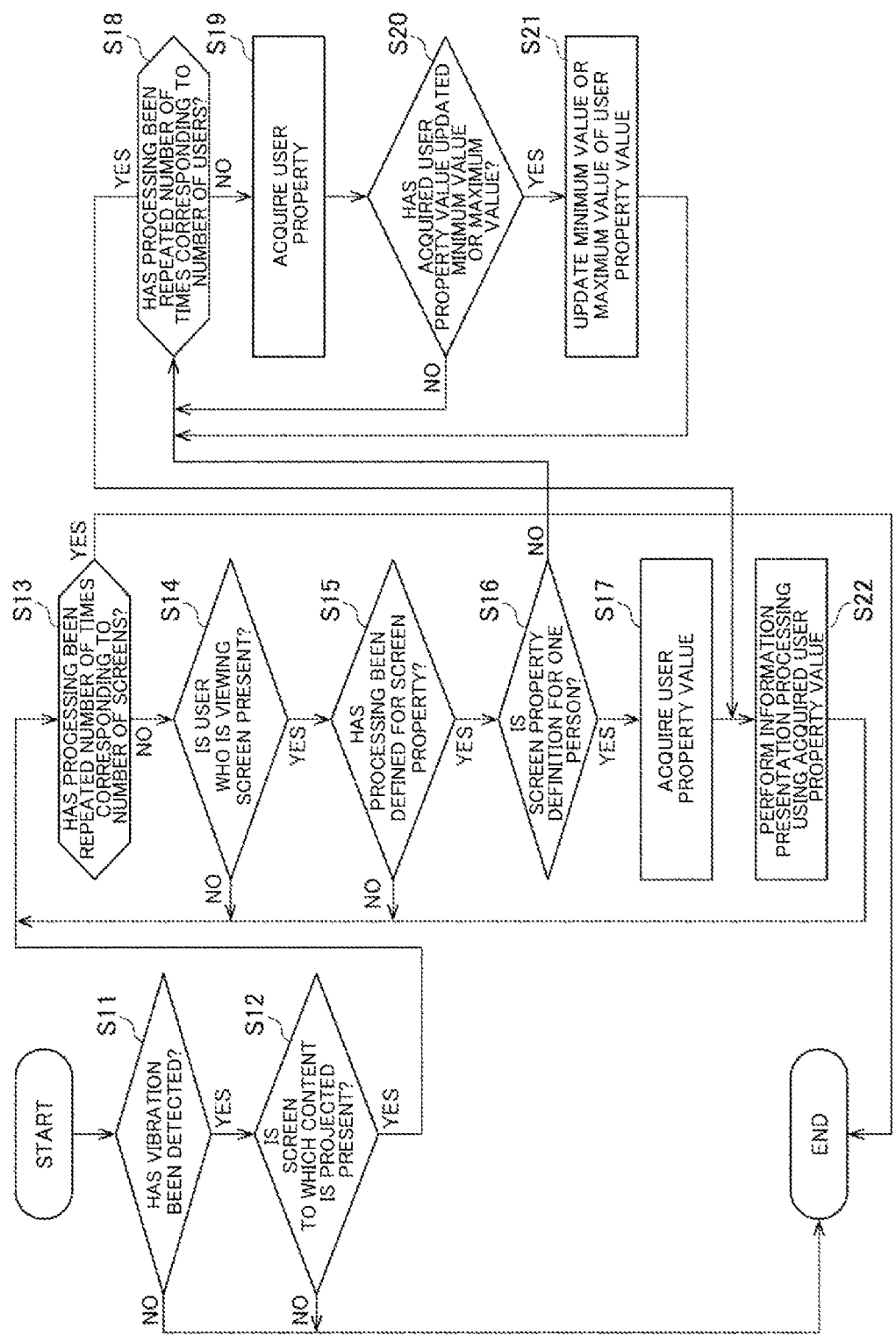
FIG. 8 is a flow chart illustrating an example of information presentation processing performed by an information processing device 11.

FIG. 8 is a flowchart illustrating an example of information presentation processing performed by the information processing device 11 in FIG. 1.

In Step S11, the information presentation unit 35 of the presentation processing unit 24 determines whether or not vibration has been detected by the vibration detection unit 32.

In a case in which it is determined that vibration has not been detected in Step S11, the processing of the flowchart ends.

In a case in which it is determined that vibration has been detected in Step S11, the processing proceeds from Step S11 to Step S12.

In Step S12, the information presentation unit 35 determines whether or not a screen to which content is projected (display location) is present.

In a case in which it is determined that the screen is not present in Step S12, the processing of the flow chart ends.

In a case in which it is determined that the screen is present in Step S12, the processing proceeds from Step S12 to Step S13.

In Step S13, the information presentation unit 35 determines whether the following processing in Steps S14 to S22 has been performed the number of times corresponding to the number of screens.

In a case in which it is determined that the following processing in Steps S14 to S22 has been performed the number of times corresponding to the number of screens in Step S13, the processing of the flow chart ends.

In a case in which it is determined that the following processing in Steps S14 to S22 has not been performed the number of times corresponding to the number of screens in Step S13, the processing proceeds from Step S13 to Step S14.

In Step S14, the information presentation unit 35 determines whether or not a user who is viewing a screen as a target of processing is present on the assumption that a screen with a screen ID before processing is the screen as the target of processing.

In other words, the information presentation unit 35 acquires, from the screen property definition unit 33, the assumed number of users defined as a screen property of the screen as the target of processing. Specifically, the information presentation unit 35 acquires, from the screen property definition unit 33, data stored in the "assumed number of users" field in the record corresponding to the screen ID of the screen as the target of processing in the screen property table in FIG. 6.

Also, the information presentation unit 35 acquires a sensor signal from a seat sensor placed at each seat as a sensor of the input unit 21 or a captured image from an image sensor placed in the vehicle interior 91 as a sensor of the input unit 21 and detects whether or not any user is present at each seat in the vehicle interior 91.

Then, the information presentation unit 35 detects the number of users who are seated in the seat from which the screen as the target of processing is used. The seats from which the screen as the target of processing is used mean seats in which the users are assumed to be seated when the users use the screen as the target of processing.

The information presentation unit 35 determines that there is a user who is viewing the screen as a target of processing if the number of users is equal to or greater than one and determines that there is no user who is viewing the screen as the target of processing if the number of users is zero, as a result of detection.

Note that the information presentation unit 35 may detect a direction of the face or a direction of sight of each user who is present in the vehicle interior 91 and detect the number of users who are viewing the screen as the target of processing, on the basis of the captured image acquired from the image sensor.

In a case in which it is determined that there is no user who is viewing the screen as the target of processing in Step S14, the processing returns from Step S14 to Step S13, and the processing from Step S13 is repeated.

In a case in which it is determined that there is a user who is viewing the screen as the target of processing in Step S14, the processing proceeds from Step S14 to Step S15.

In Step S15, the information presentation unit 35 determines whether or not processing to be performed when vibration occurs has been defined as a screen property of the screen that is the target of processing.

In other words, the information presentation unit 35 acquires, from the screen property definition unit 33, data stored in the "processing" field in the record corresponding to the screen ID of the screen that is the target of processing in the screen property table in FIG. 6.

The information presentation unit 35 determines that the processing to be performed when vibration occurs has not been defined in a case in which data in the "processing" field from the screen property definition unit 33 is "doing nothing". The information presentation unit 35 determines that the processing to be performed when vibration occurs has been defined in a case in which data in the "processing" field from the screen property definition unit 33 is something other than "doing nothing".

In a case in which it is determined that the processing to be performed when vibration occurs has not been defined in Step S15, the processing is returned from Step S15 to Step S13, and the processing from Step S13 is repeated.

In a case in which it is determined that the processing to be performed when vibration occurs has been defined in Step S15, the processing proceeds from Step S15 to Step S16.

In Step S16, the information presentation unit 35 determines whether or not a definition of the screen property of the screen that is the target of processing is for one person.

In other words, the information presentation unit 35 acquires, from the screen property definition unit 33, the assumed number of users defined as a screen property of the screen that is the target of processing and determines whether or not the acquired assumed number of users is one, similarly to Step S14. Note that since the assumed number of users has already been acquired in Step S14, the assumed number of users may not be acquired again from the screen property definition unit 33 in Step S16.

In a case in which it is determined that the definition of the screen property of the screen that is the target of processing is for one person in Step S16, the processing proceeds from Step S16 to Step S17.

In Step S17, the information presentation unit 35 acquires a user property value of the user who is viewing the screen that is the target of processing from the user property definition unit 34.

The information presentation unit 35 acquires a captured image from an image sensor as an input unit 21 and detects attributes (a race, an adult or a child, and a seated position) defined in the user property table in FIG. 7 from the sizes or the like of the face, the pupils, and the body of the user who is viewing the screen that is the target of processing on the basis of the acquired captured image. Note that in a case in which detection regarding whether a user is present in each seat in the vehicle interior 91 or the like is performed on the basis of the captured image of the image sensor in Step S14, detection of user's attributes may be performed at that time.

Also, the information presentation unit 35 may detect classification of a race that is a user's attribute on the basis of a nation, a region, or the like where the automobile 51 is being used. Also, the information presentation unit 35 may detect classification of an adult or a child that is a user's attribute on the basis of the weight of the user who is seated from a seating sensor or the like at each seat. Additionally, although the information presentation unit 35 may detect classification of the seat position from a sensor signal from a seating sensor or the like, there is no need to perform the detection since the screen property of the screen that is the target of processing is for one person and the position of the seat from which the screen that is the target of processing is used can thus be specified.

Also, the information presentation unit 35 acquires, from the user property definition unit 34, a user ID corresponding to the detected user's attribute and data in the "brightness" field, the "blur" field, the "area" field, and the "transparency" field that is data of the "user property value" in the record corresponding to the user ID in the user property table in FIG. 7. The information presentation unit 35 regards the acquired data in each of the "brightness" field, the "blur" field, the "area" field, and the "transparency" field as a user property value related to each of brightness, blur, area, and transparency for the user who is viewing the screen that is the target of processing. The processing proceeds from Step S17 to Step S22.

On the other hand, in a case in which it is determined that the definition of the screen property of the screen that is the target of processing is not for one person in Step S16, the processing proceeds from Step S16 to Step S18.

In Step S18, the information presentation unit 35 determines whether or not the following processing in Step S18 to S21 has been repeated the number of times corresponding to the number of users who are viewing the screen that is the target of processing.

Here, since the information presentation unit 35 has detected the number of users who are seated in the seat from which the screen that is the target of processing is used in Step S14, the information presentation unit 35 uses the detected number as the number of users who are viewing the screen that is the target of processing.

Note that in a case in which the information presentation unit 35 has detected the direction of the face or the direction of sight of each user who is present in the vehicle interior 91 and has detected the number of users who are viewing the screen that is the target of processing on the basis of the captured image acquired from the image sensor in Step S14, the detected number may be regarded as the number of users who are viewing the screen that is the target of processing.

In a case in which it is determined that the following processing in Steps S18 to S21 has been repeated the number of times corresponding to the users who are viewing the screen that is the target of processing in Step S18, the processing proceeds from Step S18 to Step S22.

In a case in which it is determined that the following step in Steps S18 to S21 has not been repeated the number of times corresponding to the users who are viewing the screen that is the target of processing in Step S18, the processing proceeds from Step S18 to Step S19.

In Step S19, the information presentation unit 35 regards a user for who processing has not yet been performed as a user as a target of processing and acquires user properties of the user who is the target of processing.

Specifically, the information presentation unit 35 detects attributes (a race, an adult or a child, and a seated position) of the user who is the target of processing on the basis of the captured image or the like from the image sensor similarly to Step S17. Note that in a case in which detection regarding whether a user is present in each seat in the vehicle interior 91 or the like is performed on the basis of the captured image of the image sensor in Step S14, detection of user's attributes may be performed at that time.

Also, the information presentation unit 35 acquires, from the user property definition unit 34, the user ID corresponding to the detected attributes of the user and data in the "brightness" field, the "blur" field, the "area" field, and the "transparency" field that is data of the "user property value" in the record corresponding to the user ID in the user property table in FIG. 7 similarly to Step S17. The processing proceeds from Step S19 to Step S20.

In Step S20, the information presentation unit 35 determines whether or not the data of the "user property value" in FIG. 7 in the user properties of the user who is a target of processing acquired from the user property definition unit 34 in Step S19 is a value that updates the minimum value or the maximum value.

In a case in which it is determined that the data of the "user property value" is not a value that updates the minimum value or the maximum value in Step S20, the processing is returned from Step S20 to Step S18, and the processing from Step S18 is repeated.

In a case in which it is determined that the data of the "user property value" is a value that updates the minimum value or the maximum value in Step S20, the processing proceeds from Step S20 to Step S21.

In Step S21, the minimum value or the maximum value is updated with the data of the "user property value" of the user who is the target of processing. The processing is returned from Step S21 to Step S18, and the processing from Step S18 is repeated.

Here, the processing of updating the minimum value or the maximum value of the "user property value" in Step S21 will be described.

The updating processing in Step S21 is processing for obtaining a minimum value or a maximum value for the data in each of the "brightness" field, the "blur" field, the "area" field, and the "transparency" field that is data of the "user property value" in FIG. 7 which is a minimum value or a maximum value for all the users who are viewing the screen that is the target of processing.

In other words, the information presentation unit 35 obtains, as a minimum value of brightness, the minimum data among the data in the "brightness" fields for all the users who are viewing the screen that is the target of processing.

Also, the information presentation unit 35 obtains, as a maximum value of blur, the maximum data among the data in the "blur" fields for all the users who are viewing the screen that is the target of processing.

Also, the information presentation unit 35 obtains, as a minimum value of the area, the minimum data among the data in the "area" fields for all the users who are viewing the screen that is the target of processing.

Additionally, the information presentation unit 35 obtains, as a maximum value of transparency, the maximum data among the data in the "transparency" fields for all the users who are viewing the screen that is the target of processing.

Then, the information presentation unit 35 regards the obtained minimum value of brightness, the maximum value of blur, the minimum value of the area, and the maximum value of transparency as user property values related to the brightness, the blur, the area, and the transparency for (all) the users who are viewing the screen that is the target of processing.

Once the processing proceeds from Step S18 or Step S17 to Step S22, the information presentation unit 35 performs information presentation processing using the acquired user property values.

Specifically, in a case in which the number of users who are viewing the screen that is the target of processing is one, the information presentation unit 35 performs the information presentation processing using the user property values related to the brightness, the blur, the area, and the transparency acquired in Step S17. Also, in a case in which a plurality of users are viewing the screen that is the target of processing, the information presentation unit 35 performs the information presentation processing using the user property values related to the brightness, the blur, the area, and the transparency acquired in Step S21.

Also, the information presentation unit 35 acquires, from the screen property definition unit 33, the data in the "processing" field in the record corresponding to the screen ID of the screen that is the target of processing in the screen specification table in FIG. 6. The information presentation unit 35 sets processing to be performed on the screen that is the target of processing when vibration occurs as data in the "processing" field.

Also, in a case in which the processing to be performed on the screen that is the target of processing when vibration occurs is processing of lowering brightness, the information presentation unit 35 changes brightness of the projection image to be projected from the projector to the screen that is the target of processing to brightness indicated by the user property value related to brightness.

In addition, in a case in which the processing to be performed on the screen that is the target of processing when vibration occurs is processing of applying blur, the information presentation unit 35 performs blurring processing corresponding to the user property value related to the blur on the projection image to be projected from the projector to the screen that is the target of processing.

Additionally, in a case in which the processing to be performed on the screen that is the target of processing when vibration occurs is processing of reducing the area, the information presentation unit 35 changes the area of the projection image to be projected from the projector to the screen that is the target of processing to the area indicated by the user property value related to the area.

Also, in a case in which the processing to be performed on the screen that is the target of processing when vibration occurs is processing of changing transparency, the information presentation unit 35 changes the transparency of the projection image to be projected from the projector to the screen that is the target of processing to transparency indicated by the user property value related to the transparency.

After the aforementioned processing, the processing is returned from Step S22 to Step S13, and the processing from Step S13 is repeated. In a case in which it is determined that the processing in Steps S14 to S22 has been performed on all the screens to which some contents are projected in Step S13, the processing of this flow chart ends.

According to the information presentation processing of the information processing device 11 as described above, it is possible to prevent carsickness and an uncomfortable feeling due to moving or shaking of images that the users are viewing in advance when vibration occurs in the automobile itself. Note that the information presentation unit 35 may change the amount of change (the amount of change from a case in which vibration is not occurring) in brightness, blur, area, and transparency of the projection image when vibration occurs in accordance with the magnitude of the vibration, and for example, the information presentation unit 35 may increase the amount of change as the vibration increases.

<Display Mode of Projection Image when Vibration Occurs>

Hereinafter, modes of information presentation processing performed by the information processing device 11 when vibration occurs will be described.

(Mode 1)

Figure 9:
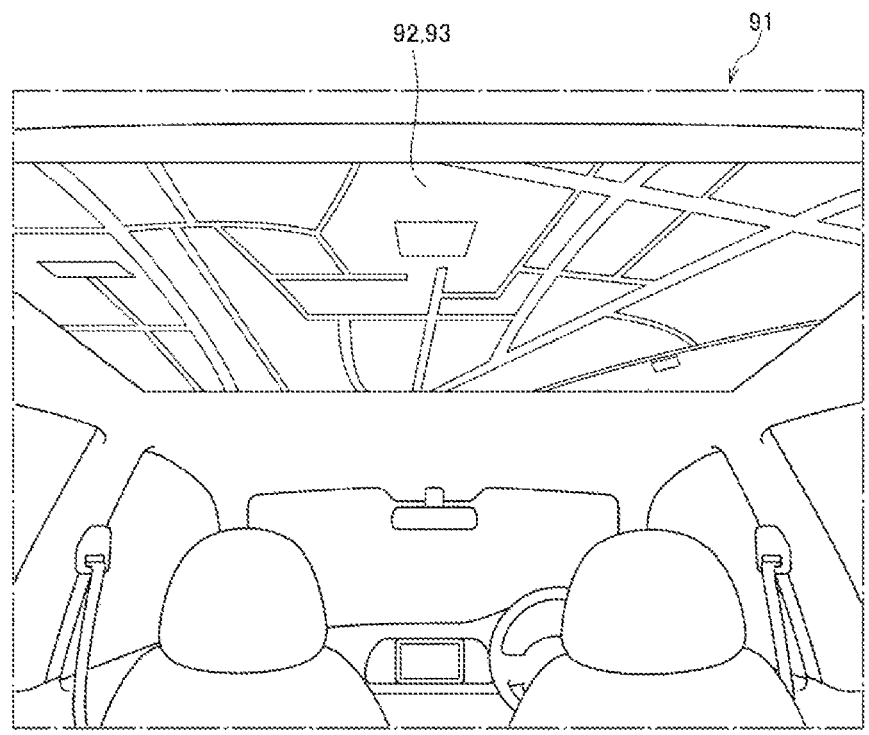
FIG. 9 is a diagram illustrating, as an example, a projection image 93 on a ceiling 92 when vibration is not occurring.

FIG. 9 is a diagram illustrating, as an example, the projection image 93 on the ceiling 92 when vibration is not occurring.

The projection image 93 in FIG. 9 is a projection image of a map, for example, projected to the ceiling 92 in a case in which the screen is the ceiling 92.

Figure 10:
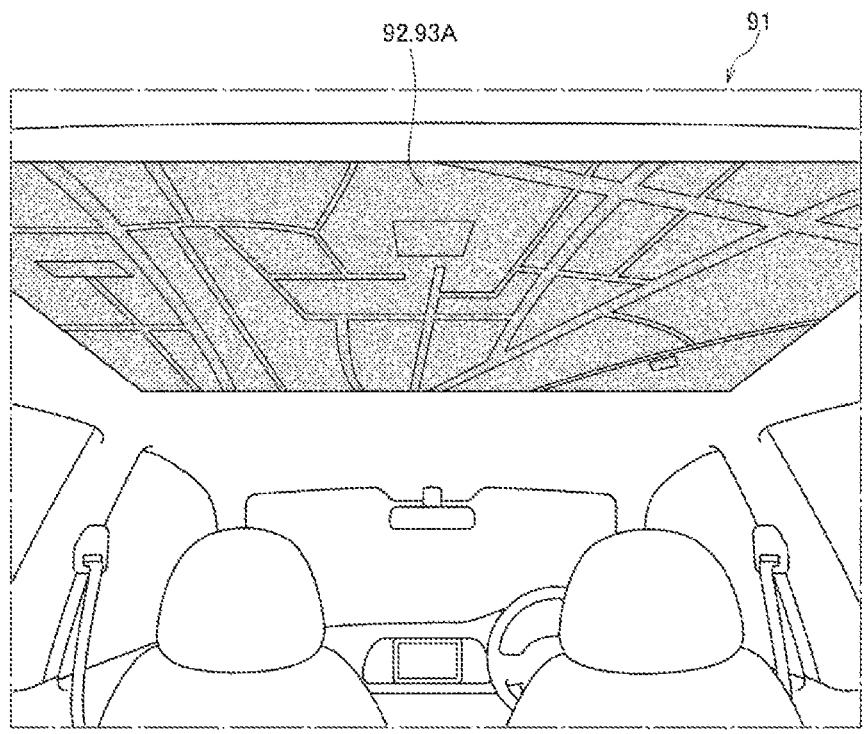
FIG. 10 is a diagram for explaining a mode 1 of information presentation processing when vibration occurs.

FIG. 10 is a diagram for explaining a mode 1 of information presentation processing performed when vibration occurs.

The projection image 93 in FIG. 10 is a projection image in a case in which the information presentation unit 35 performs processing of lowering brightness (reducing brightness) on the projection image 93 in FIG. 9 (on the screen) when vibration occurs. The processing of lowering brightness of the projection image 93 is executed in a case in which the screen ID of the screen is #S1 in the screen property table in FIG. 6. According to the mode 1 of the information presentation processing, the projection image 93 is dark as a whole as compared with FIG. 9, and visibility is degraded.

(Mode 2)

Figure 11:
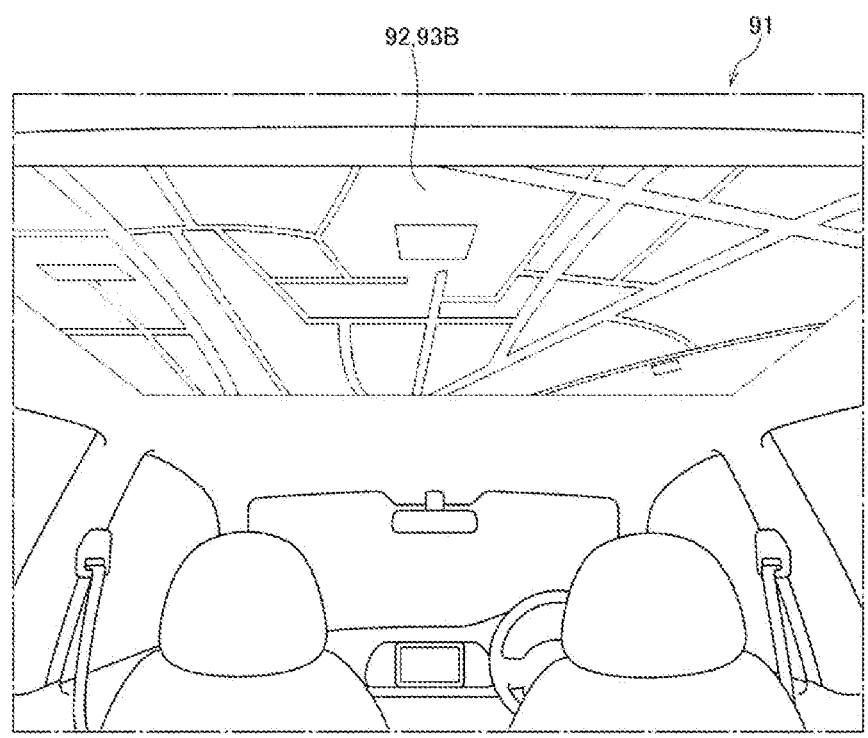
FIG. 11 is a diagram for explaining a mode 2 of information presentation processing when vibration occurs.

FIG. 11 is a diagram for explaining a mode 2 of information presentation processing performed when vibration occurs.

The projection image 93 in FIG. 11 is a projection image in a case in which the information presentation unit 35 performs the processing of applying blur to the projection image 93 in FIG. 9 when vibration occurs. The processing of applying blur to the projection image 93 is executed in a case in which the screen ID of the screen is #S2 in the screen property table in FIG. 6. According to the mode 2 of the information presentation processing, the projection image 93 is not clear as a whole as compared with FIG. 9.

(Mode 3)

Figure 12:
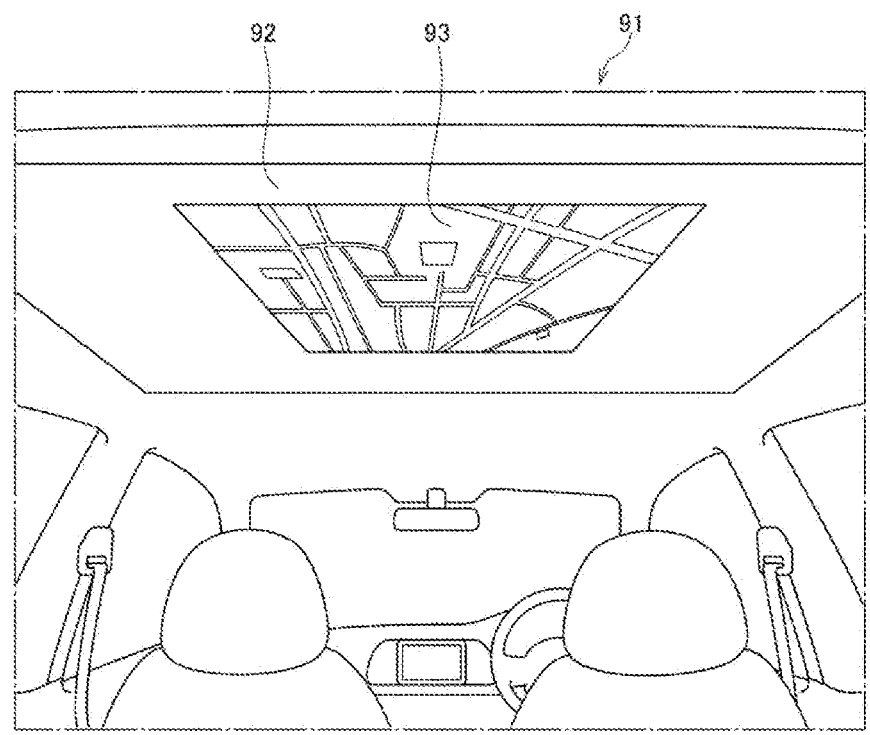
FIG. 12 is a diagram for explaining a mode 3 of information presentation processing when vibration occurs.

FIG. 12 is a diagram for explaining a mode 3 of information presentation processing performed when vibration occurs.

The projection image 93 in FIG. 12 is a projection image in a case in which the information presentation unit 35 performs processing of reducing the area on the projection image 93 in FIG. 9 when vibration occurs. The processing of reducing the projection image 93 is executed in a case in which the screen ID of the screen is #S3 in the screen property table in FIG. 6. According to the mode 3 of the information presentation processing, the proportion of the projection image 93 occupying the field of view decreases.

According to all the modes 1 to 3 of the information presentation processing in FIGS. 10 to 12 described above, the projection image 93 becomes difficult to be seen when vibration occurs, but in accordance with this, it is possible to reduce carsickness and an uncomfortable feeling due to vibration of the projection image 93. Note that it is possible to employ an arbitrary parameter among brightness, blur, area, and transparency of the projection image that are parameters related to presentation information as a parameter to be changed when vibration occurs, and it is possible to employ a plurality of parameters as parameters to be changed when vibration occurs. Also, as in modes 4 to 11 of the information presentation processing, which will be described below, for example, a change in value performed on any of the parameters of brightness, blur, area, and transparency of the projection image when vibration occurs can also be similarly applied to a case in which another parameter is changed. For example, a mode related to lowering of brightness of the projection image when vibration occurs can be similarly applied as a mode related to applying blur to the projection image, a mode of reducing the area of the projection image, and a mode of changing transparency of the projection image when vibration occurs.

(Mode 4)

Figure 13:
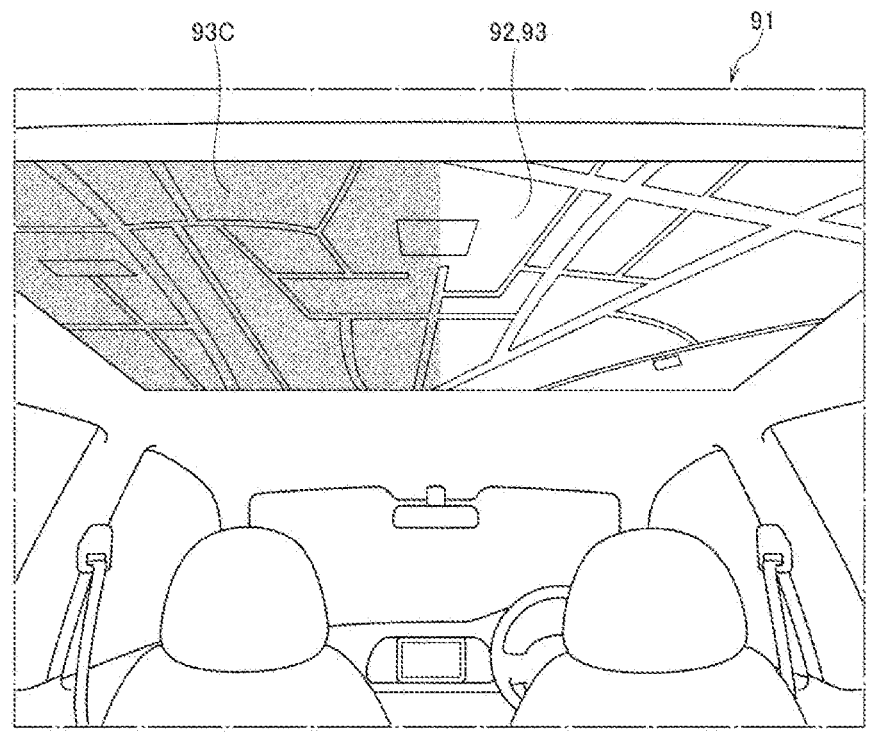
FIG. 13 is a diagram for explaining a modification example (mode 4) of the mode 1 of the information presentation processing in FIG. 10.

FIG. 13 is a diagram for explaining a modification example (mode 4) of the mode 1 of the information presentation processing in FIG. 10.

The projection image 93 in FIG. 13 is a projection image in a case in which the information presentation unit 35 performs processing of lowering brightness (reducing brightness) on the projection image 93 in FIG. 9 when vibration occurs. However, unlike the case in FIG. 10, the projection image 93 in FIG. 13 is a projection image in a case in which processing of lowering only brightness at the portion 93C on the side of the seat in which the user is being seated with respect to the projection image 93. In this manner, the information presentation unit 35 may lower only brightness at the portion 93C on the side of the seat of the user who is viewing the screen without lowering brightness of the entire projection image 93 (entire screen) when vibration occurs. In this manner, the close portion in the projection image 93 in the field of view of the user becomes dark, and carsickness and an uncomfortable feeling caused by vibration are thus reduced.

(Mode 5)

Figure 14:
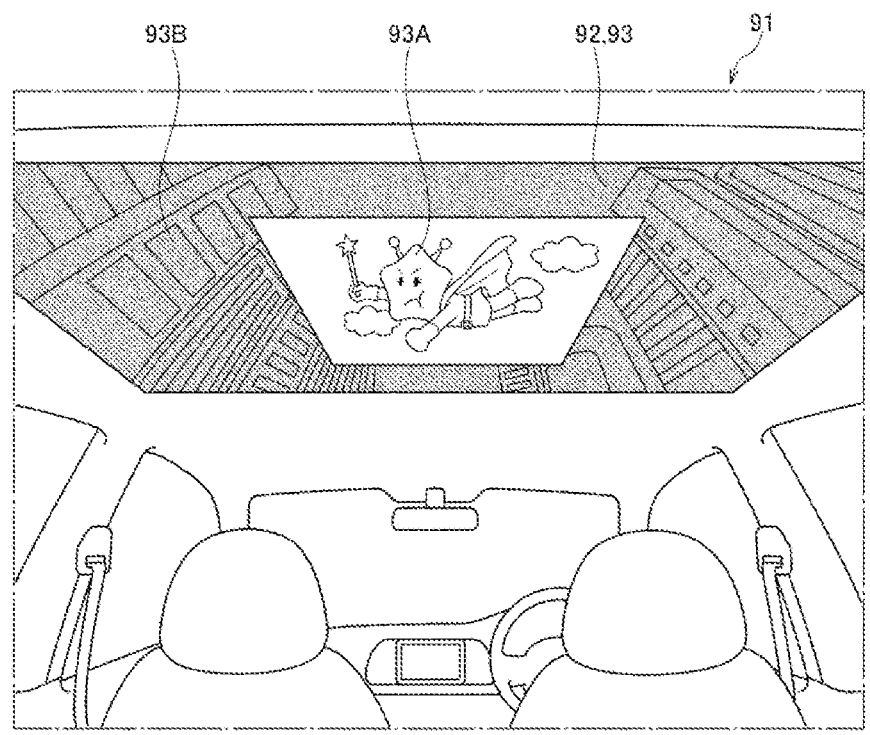
FIG. 14 is a diagram illustrating, as an example, a projection image 93 on a ceiling 92 when vibration is not occurring.

FIG. 14 is a diagram illustrating, as an example, the projection image 93 on the ceiling 92 when vibration is not occurring.

The projection image 93 in FIG. 14 is a projection image projected to the ceiling 92 in a case in which the screen is the ceiling 92 similarly to the case in FIG. 9.

The projection image 93 in FIG. 14 is configured of a content image 93A that is projection of content such as a video, for example, and an outside-vehicle image 93B that is projection of a landscape outside the vehicle captured by a camera with a fisheye lens mounted on the ceiling of the vehicle, for example. The outside-vehicle image 93B is displayed as a background in the surroundings of the content image 93A. The outside-vehicle image 93B is displayed with transparency of about 25%, for example, when vibration is not occurring. Note that as transparency increases, the brightness of the outside-vehicle image 93B to be projected to the ceiling 92 increases.

According to the projection image 93, the user feels motion of the vehicle body in the surrounding field of view and is less likely to suffer from carsickness by allowing the user to view the landscape outside the vehicle in the surroundings of the content image 93A.

Figure 15:
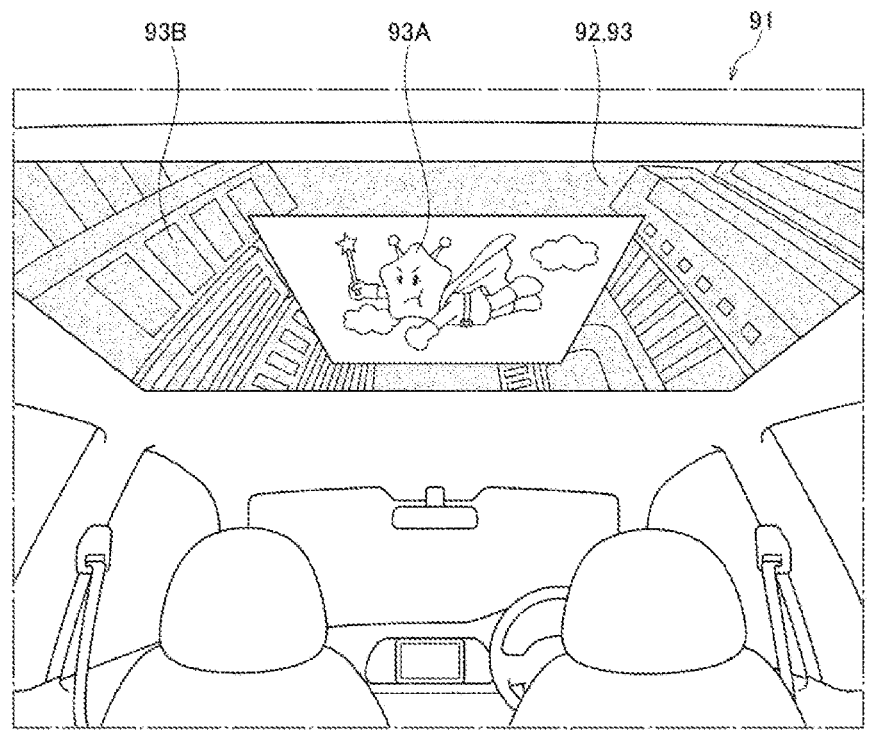
FIG. 15 is a diagram for explaining a mode 5 of information presentation processing when vibration occurs.

FIG. 15 is a diagram for explaining a mode 5 of information presentation processing performed when vibration occurs.

The projection image 93 in FIG. 15 is a projection image in a case in which the information presentation unit 35 performs processing of changing (increasing) transparency on the projection image 93 in FIG. 14 when vibration occurs. The transparency of the outside-vehicle image 93B that is the background in the projection image 93 is higher than that in FIG. 14. Specifically, the transparency of the outside-vehicle image 93B in FIG. 15 increases from about 25% to about 50%. The processing of increasing transparency of the outside-vehicle image 93B is executed in a case in which the screen ID of the screen is #S4 in the screen property table in FIG. 6. According to the mode 5, the outside of the vehicle is seen to a higher extent when vibration occurs, and it is thus possible to curb carsickness even in a case in which vibration occurs.

(Mode 6)

Figure 16:
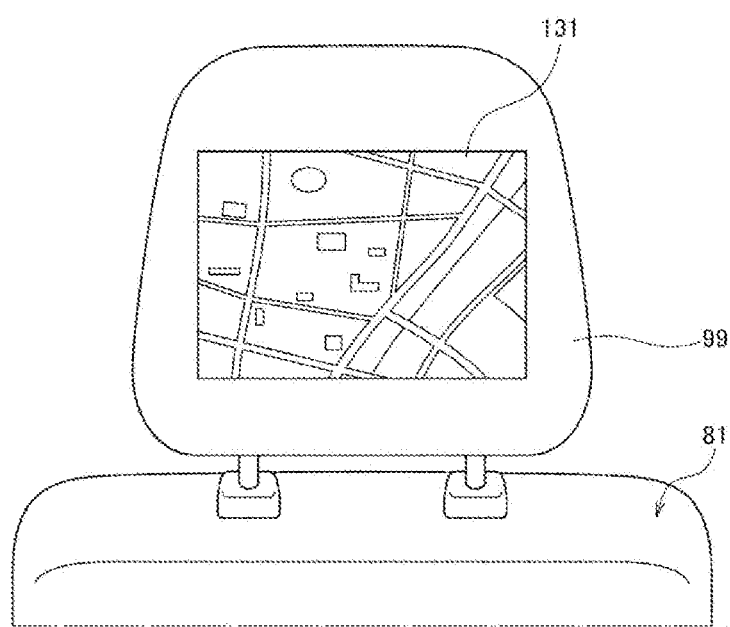
FIG. 16 is a diagram illustrating, as an example, a projection image 131 on a headrest 99 when vibration is not occurring.

FIG. 16 is a diagram illustrating, as an example, of a projection image 131 on the headrest 99 when vibration is not occurring.

The projection image 131 in FIG. 16 is a projection image of a map, for example, projected to the headrest 99 in a case in which the screen is the headrest 99. Brightness of the projection image 131 when vibration is not occurring is 100%.

Figure 17:
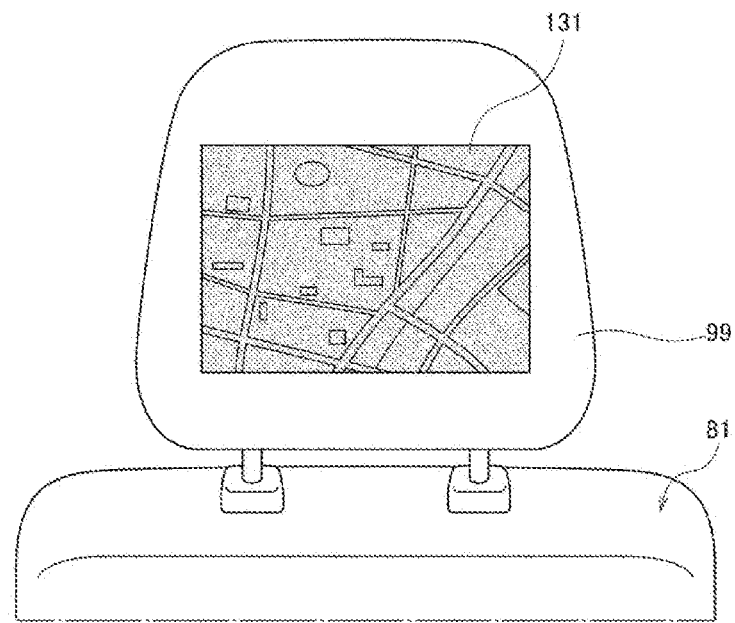
FIG. 17 is a diagram for explaining a mode 6 of information presentation processing when vibration occurs.
Figure 18:
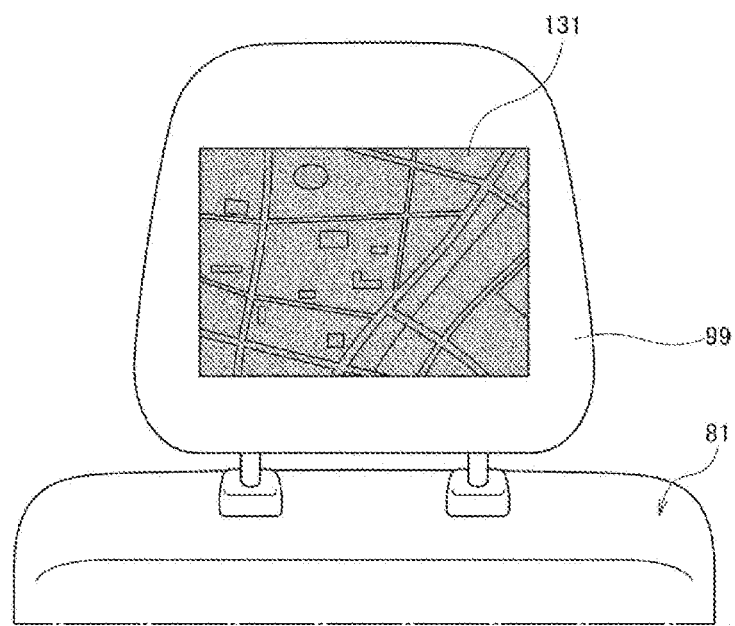
FIG. 18 is a diagram for explaining a mode 6 of information presentation processing when vibration occurs.

FIGS. 17 and 18 are diagrams for explaining a mode 6 of the information presentation processing when vibration occurs.

Both the projection images 131 in FIGS. 17 and 18 are projection images in a case in which the information presentation unit 35 performs processing of lowering brightness on the projection image 131 in FIG. 16 when vibration occurs. The processing of lowering brightness is executed in a case in which the screen ID of the screen is #S6 in the screen property table in FIG. 6, for example. The projection image in FIG. 17 has brightness lowered to 75%, and the projection image in FIG. 18 has brightness lowered to 50%.

Here, the user property value related to brightness is 75% in a case in which the user who is viewing the projection image 131 is an adult with the user ID #U1, for example, in the user property table in FIG. 7.

Therefore, the projection image 131 has brightness lowered to 75% as in FIG. 17 when vibration occurs in a case in which the user with the user ID #U1 is viewing the projection image 131.

On the other hand, the user property value related to brightness is 50% in a case in which the user who is viewing the projection image 131 is a child with the user ID #U2, for example, in the user property table in FIG. 7.

Therefore, the projection image 131 has brightness lowered to 50% as in FIG. 18 when vibration occurs in a case in which the user with the user ID #U2 is viewing the projection image 131.

In this manner, since children have lower durability against vibration than adults, the user property definition unit 34 defines further lowering brightness for the children than for the adults. According to the user property definition unit 34, it is possible to allow the user to comfortably maintain his/her viewing experience even when vibration occurs, by performing optimization for each user.

Since the headrest has a small projection area, there may also be a case in which nothing has to be done as information presentation processing when vibration occurs. For such a case, the screen ID of the screen is defined as #S5 in the screen property table in FIG. 6.

(Mode 7)

Figure 19:
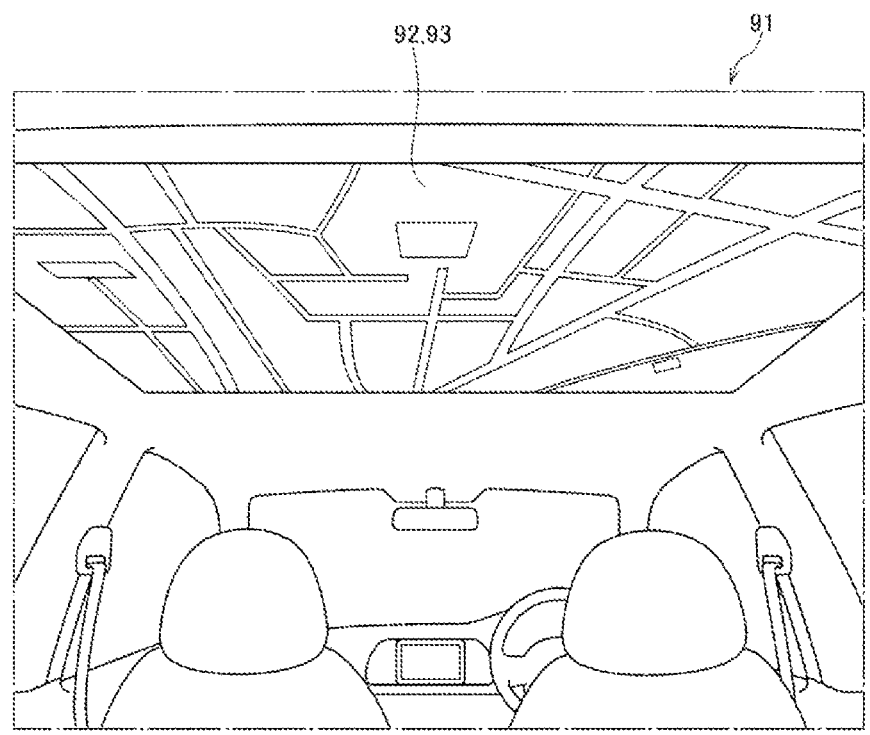
FIG. 19 is a diagram illustrating, as an example, a projection image 93 on a ceiling 92 when vibration is not occurring.

FIG. 19 is a diagram illustrating, as an example, the projection image 93 on the ceiling 92 when vibration is not occurring.

The projection image 93 in FIG. 19 is a projection image of a map, for example, projected to the ceiling 92 in a case in which the screen is the ceiling 92. The projection image 93 in FIG. 19 is brightness of 100%.

Also, the ceiling 92 to which the projection image 93 is projected is defined as a screen that has screen properties of the screen ID #S1 in the screen property table in FIG. 6. Therefore, the information presentation unit 35 executes processing of lowering brightness of the projection image 93 when vibration occurs.

Figure 20:
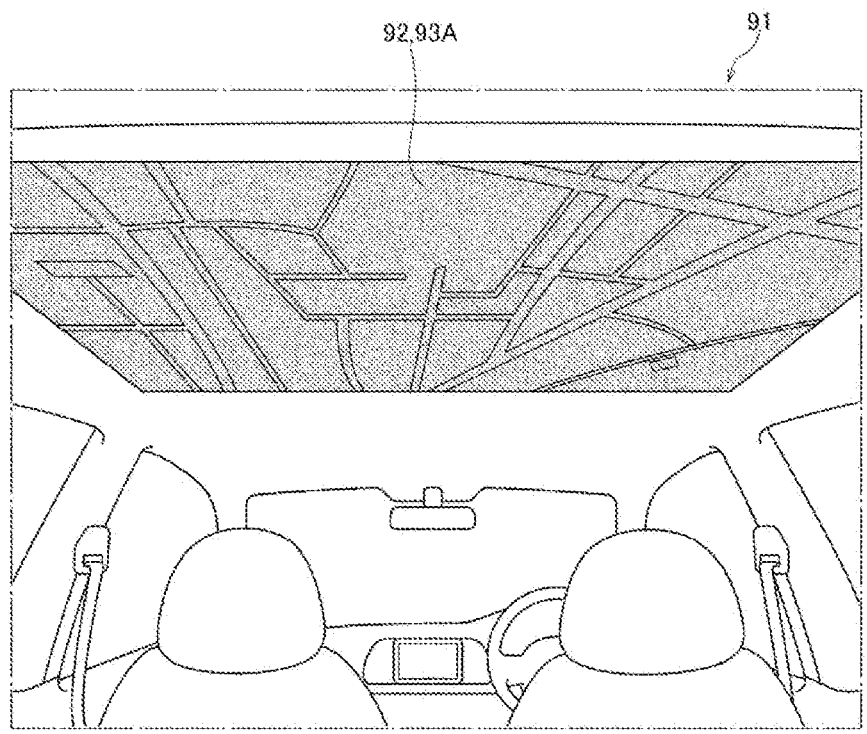
FIG. 20 is a diagram for explaining a mode 7 of information presentation processing when vibration occurs.

FIG. 20 is a diagram for explaining a mode 7 of information presentation processing performed when vibration occurs.

The projection image 93 in FIG. 20 is a projection image in a case in which the information presentation unit 35 performs processing of lowering brightness on the projection image 93 in FIG. 19 when vibration occurs. Brightness of the projection image 93 is determined by user properties of the user who is viewing the projection image 93.

For example, it is assumed that users who are viewing the projection image 93 are an adult with the user ID #U1 and a child with the user ID #U2 in the user property table in FIG. 7, for example.

In this case, the user property value related to brightness for the user properties of the user ID #U1 is 75%. On the other hand, the user property value related to brightness for the user properties of the user ID #U2 is 50%. Here, a value with which the difference from 100% that is brightness when vibration is not occurring becomes the largest is employed. Therefore, brightness of the projection image 93 when vibration occurs in FIG. 20 is 50%.

In a case in which a plurality of persons are viewing a single screen in this manner, brightness is changed by the user property value that changes from the brightness in a case in which vibration is not occurring to the maximum extent (the largest difference). Thus, the brightness of the projection image 93 becomes brightness in accordance with a user with low durability against vibration, such as a child.

The information presentation processing as in the mode 7 in the case in which a plurality of persons are viewing a single screen is not limited to brightness of the screen (projection image) and is also similarly performed in cases in which blur, area, and transparency are changed.

(Mode 8)

Figure 21:
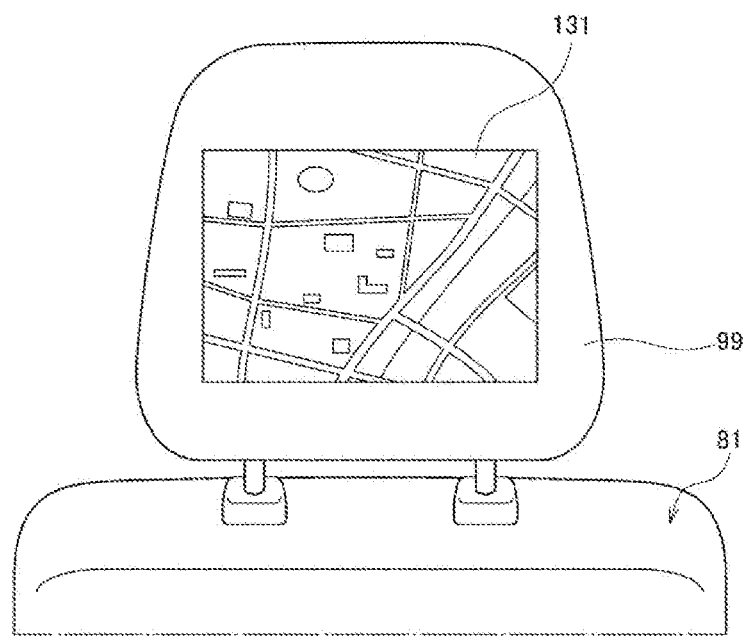
FIG. 21 is a diagram illustrating, as an example, a projection image 131 on a headrest 99 when vibration is not occurring.

FIG. 21 is a diagram illustrating, as an example, of a projection image 131 on the headrest 99 when vibration is not occurring.

The projection image 131 in FIG. 21 is a projection image of a map, for example, projected to the headrest 99 in a case in which the screen is the headrest 99. Brightness of the projection image 131 when vibration is not occurring is 100%.

Figure 22:
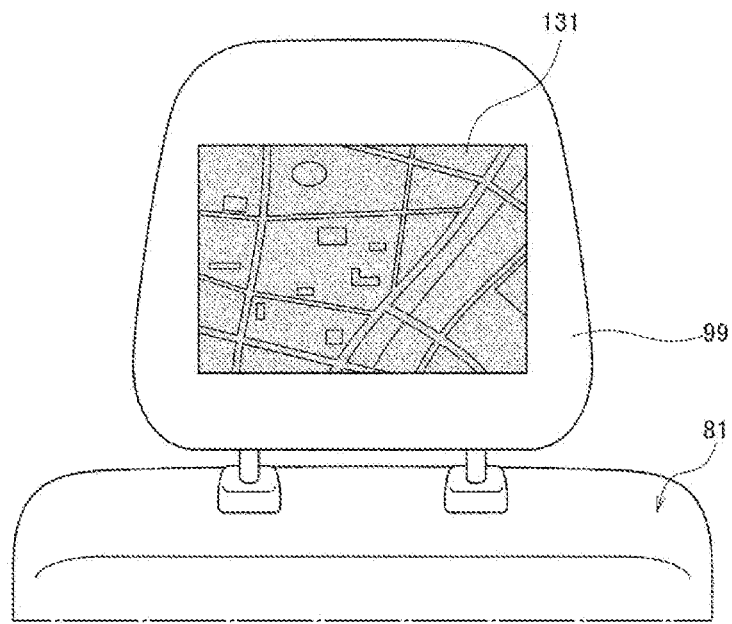
FIG. 22 is a diagram for explaining a mode 8 of information presentation processing when vibration occurs.
Figure 23:
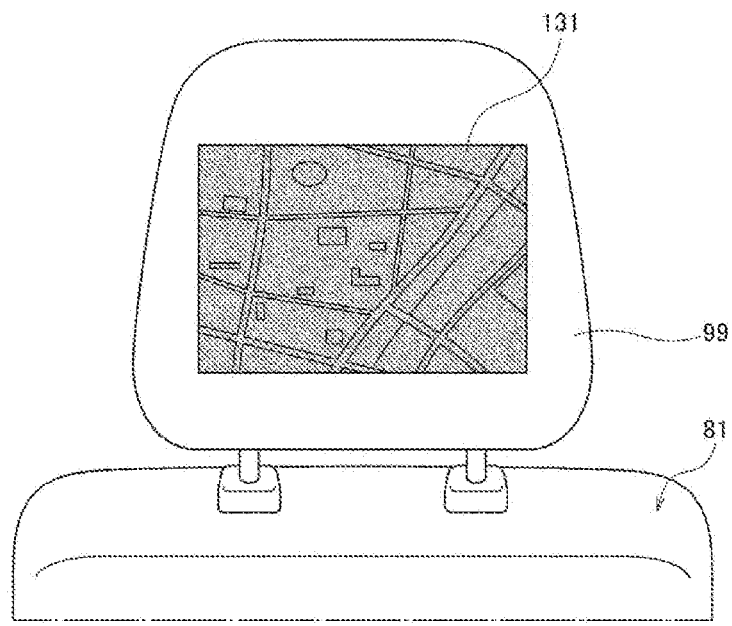
FIG. 23 is a diagram for explaining the mode 8 of information presentation processing when vibration occurs.

FIGS. 22 and 23 are diagrams for explaining a mode 8 of the information presentation processing when vibration occurs.

Both the projection images 131 in FIGS. 22 and 23 are projection images in a case in which the information presentation unit 35 performs processing of lowering brightness on the projection image 131 in FIG. 21 when vibration occurs. The processing of lowering brightness is executed in a case in which the screen ID of the screen is #S6 in the screen property table in FIG. 6, for example.

The projection image 131 in FIG. 22 is a projection image when vibration occurs in a case in which a Japanese person is viewing the projection image 131 and has brightness lowered to 75%. In other words, a Japanese person with the user ID #U1 in the user property table in FIG. 7 is viewing the projection image 131 in the example in FIG. 22.

On the other hand, the projection image 131 in FIG. 23 is a projection image when vibration occurs in a case in which a westerner is viewing the projection image 131 and has brightness lowered to 50%. In other words, the westerner with the user ID #U3 in the user property table in FIG. 7 is viewing the projection image 131 in the example in FIG. 23.

In comparison between Japanese and westerners, the westerners have lighter iris colors and are more likely to feel light in a brighter manner. Direct illuminations are used in rooms of offices and the like in many cases in Japan while indirect illuminations are used in many cases in the western countries. The properties that are different depending on races in this manner are defined by the user properties, and brightness of the projection image 131 is lowered for westerners who more strongly feel light when vibration occurs. As a method for estimating races, iris colors may be actually measured using a sensor, or estimation may be made from language setting, viewed content, and the like.

(Mode 9)

Figure 24:
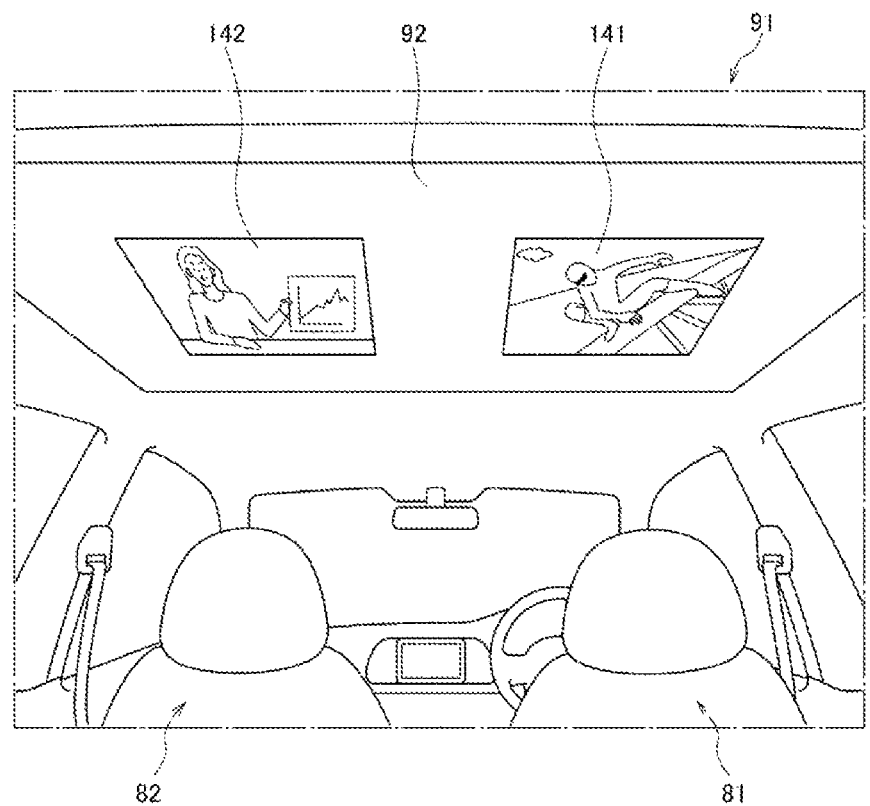
FIG. 24 is a diagram illustrating, as an example, projection images 141 and 142 on the ceiling 92 when vibration is not occurring.

FIG. 24 is a diagram illustrating, as an example, projection images 141 and 142 on the ceiling 92 when vibration is not occurring.

The projection images 141 and 142 in FIG. 24 are projection images projected to the ceiling 92 in a split manner. The projection image 141 is assumed to be viewed by the user who is a Japanese adult in the driver's seat 81, and the projection image 142 is assumed to be viewed by the user who is a Japanese adult in the front passenger seat 82. It is assumed that both the projection images 141 and 142 are displayed with brightness of 100% when vibration is not occurring.

Also, it is assumed that the ceiling 92 to which the projection image 141 and the projection image 142 are projected is defined to have the screen properties of the screen ID #S1 in the screen property table in FIG. 6. Thus, the information presentation unit 35 performs processing of lowering brightness of the projection images 141 and 142 when vibration occurs.

On the other hand, it is assumed that the user in the driver's seat 81 is defined to have the user properties of the user ID #U4 in the user property table in FIG. 7. It is assumed that the user in the front passenger seat 82 is defined to have the user properties of the user ID #U5 in the user property table.

Figure 25:
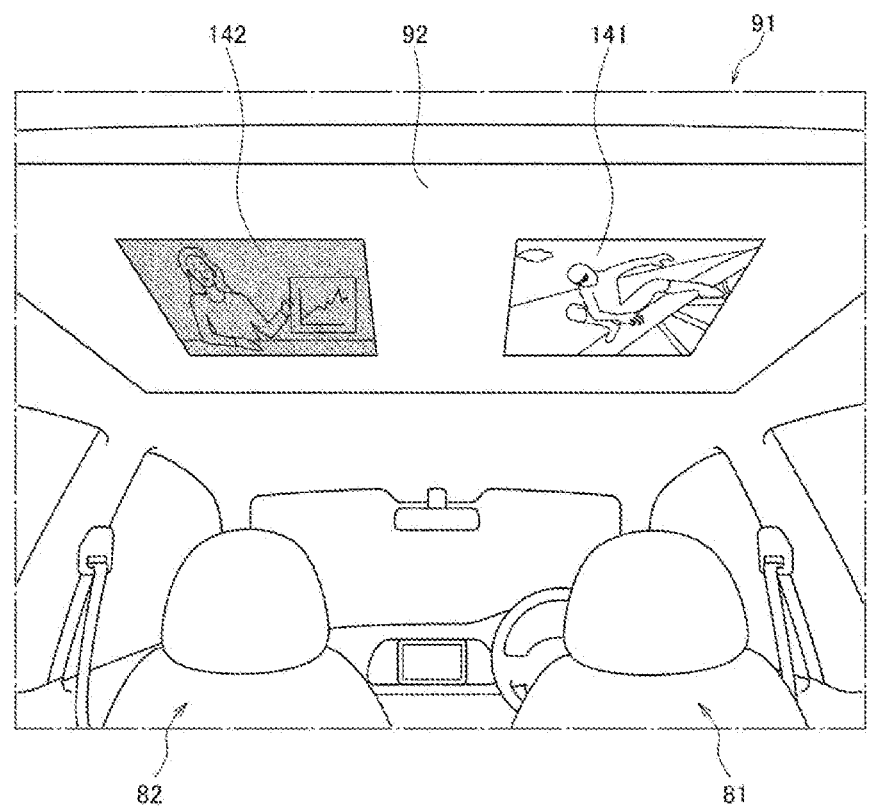
FIG. 25 is a diagram for explaining a mode 9 of information presentation processing when vibration occurs.

FIG. 25 is a diagram for explaining a mode 9 of information presentation processing performed when vibration occurs.

The projection image 141 in FIG. 25 has brightness of 100%, and the projection image 142 has brightness of 75%.

In other words, the user (driver) in the driver's seat 81 who is viewing the projection image 141 is defined to have the user properties of the user ID #U4 and the user property value of 100% in regard to brightness in the user property table In FIG. 7. Therefore, brightness of the projection image 141 is maintained at 100%.

On the other hand, the user in the front passenger seat 82 who is viewing the projection image 142 is defined to have the user properties of the user ID #U5 and the user property value of 75% in regard to brightness in the user property table in FIG. 7. Therefore, brightness of the projection image 142 is lowered to 75%.

Therefore, the projection image 141 that the driver is viewing is brighter than the projection image 142 that the user in the front passenger seat 82 is viewing. This is because the driver is more likely to expect motion of the vehicle body and is less likely to suffer from carsickness than the user in the front passenger seat 82 and it is not necessary to lower the brightness.

(Mode 10)

Figure 26:
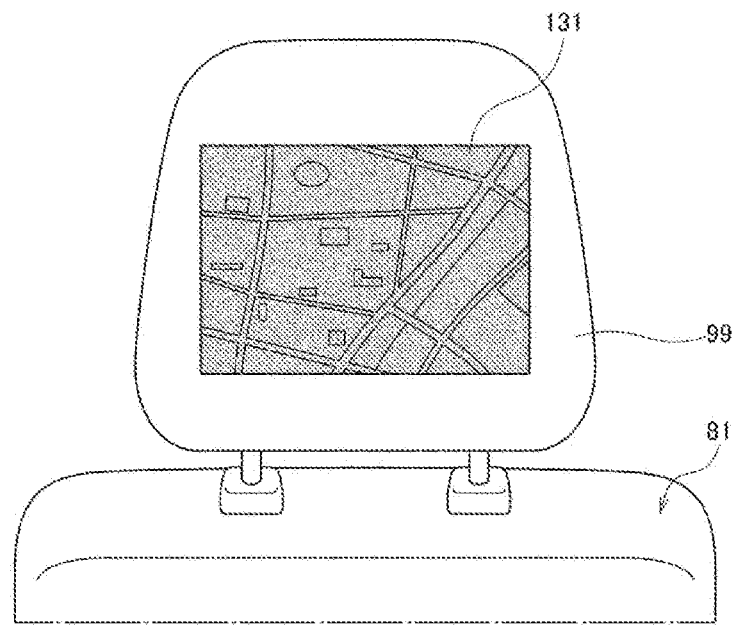
FIG. 26 is a diagram for explaining a mode 10 of information presentation processing when vibration occurs.
Figure 27:
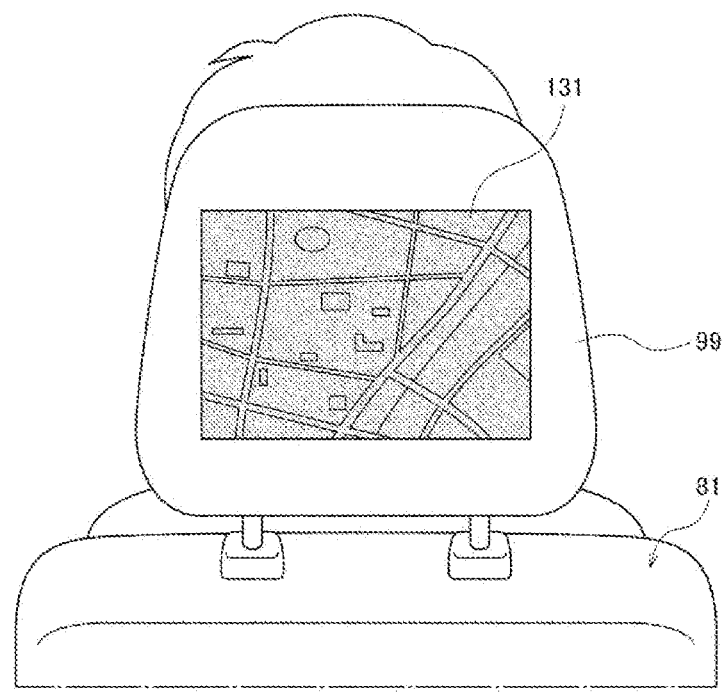
FIG. 27 is a diagram for explaining the mode 10 of information presentation processing when vibration occurs.

FIGS. 26 and 27 are diagrams for explaining a mode 10 of the information presentation processing when vibration occurs.

Both the projection images 131 in FIGS. 26 and 27 are projection images projected to the headrest 99 in a case in which the screen is the headrest 99. The projection image 131 in FIG. 26 is a projection image at the headrest 99 in a state in which the head of the user (driver) in the driver's seat 81 does not lean thereon. In this case, the headrest 99 is likely to vibrate, and the brightness of the projection image 131 is thus lowered to 50%.

On the other hand, the projection image 131 in FIG. 27 is a projection image at the headrest 99 in a state in which the head of the user (driver) in the driver's seat 81 leans thereon. In this case, the headrest 99 is unlikely to vibrate, and the brightness of the projection image 131 is thus lowered to 75%, for example, which is higher than the brightness of the projection image 131 in FIG. 26 or is maintained in the state with the brightness of 100%. The case in which the projection image 131 in FIG. 27 is maintained in the state with the brightness of 100% is equivalent to a case in which it is determined that the headrest 99 does not vibrate.

The fact that the vibration detection unit 32 may define a vibration model and estimate different vibrations for each location has been described using FIG. 5. Moreover, it is further possible to estimate vibration with high accuracy by taking user's actions into consideration along with information for each location. Swinging of the headrest also changes depending on whether or not the head of the user is leaning on the headrest 99 as in FIGS. 26 and 27. The headrest 99 in a state in which a user is seated or the head leans thereon is estimated to vibrate to a lower extent as compared with a state in which no user is seated in the seat. As a result, it is possible to further lower brightness in a case in which vibration occurs in the state in FIG. 26 than in the state in FIG. 27.

(Mode 11)

In addition to the information presentation processing based on vibration detection of the vibration detection unit 32, it is possible to perform this method (information presentation processing) on the basis of a state of a road surface obtained from the vehicle state detection unit 31 in FIG. 12 and information from other vehicles traveling in front.

In a case in which the distance from a forward vehicle becomes equal to or less than a specific distance or a brake lamp of a forward vehicle at a specific inter-vehicle distance is suddenly lit, for example, large vibration due to sudden breaking is expected. Also, in a case in which stepped pavement is present on the forward road surface, large vibration is expected depending on a passing speed.

In a case in which such prediction is established, it is possible to use the present method. In other words, the information presentation processing (a change in brightness, blur, area, or transparency of the projection image) upon occurrence of vibration may be performed when vibration is expected using vibration expected similarly to vibration detected by the vibration detection unit 32 as vibration information. Also, brightness, blur, area, or transparency of the projection image may be gradually changed to a target value when vibration is expected.

Figure 28:
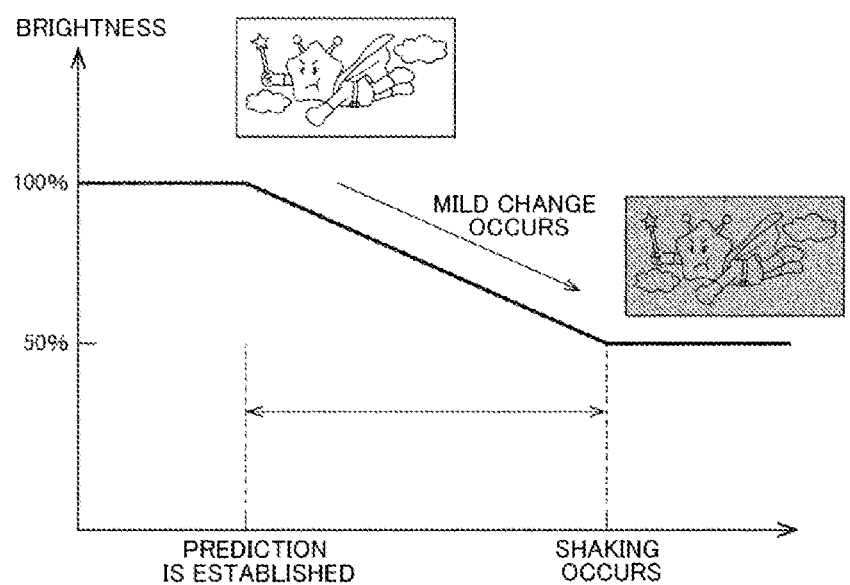
FIG. 28 is a diagram for explaining a mode 11.

FIG. 28 illustrates an exemplary case in which there is enough time until actual shaking occurs after prediction of vibration is established. In the example in FIG. 28, brightness does not suddenly change and the change in brightness is completed when shaking occurs by starting the change in brightness at the timing when the prediction is established and gradually causing the change, and a state in which an effect of preventing carsickness can be obtained is achieved.

Figure 29:
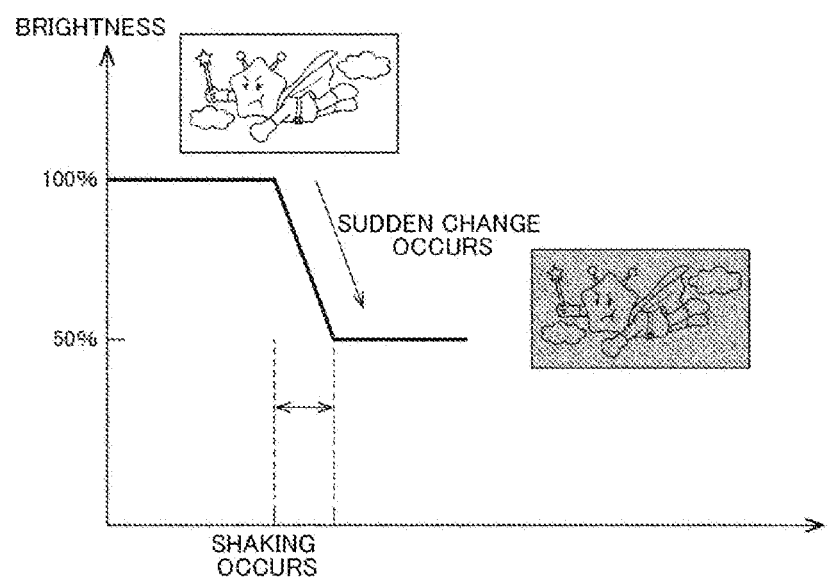
FIG. 29 is a diagram for explaining the mode 11.

On the other hand, FIG. 29 illustrates an exemplary case in which there is not enough time until actual shaking occurs after prediction of vibration is established. If processing is performed after shaking occurs as in the example in FIG. 29, it is necessary to cause the change in brightness in a short period of time, and there is a probability that usability is degraded due to the sudden change in brightness.

As described above, it is possible to improve usability by not causing a sudden change in brightness, focusing (blur, furthering), area, and transparency through execution of the present method using information other than actual vibration as a trigger.

(Mode 12)

Figure 30:
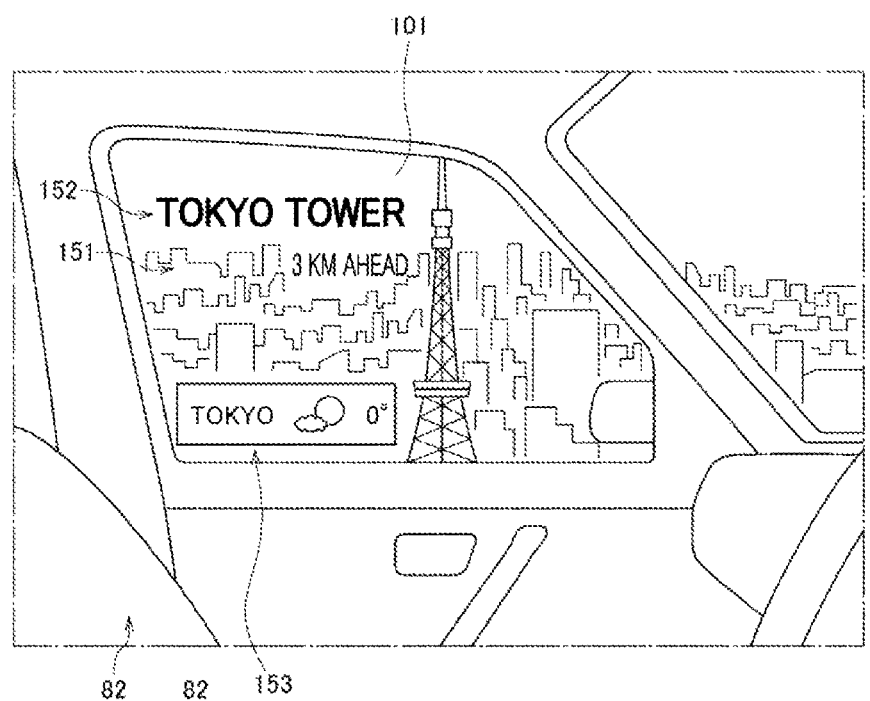
FIG. 30 is a diagram illustrating, as an example, a projection image 151 projected to a door glass 101 of a front passenger seat 82 when vibration is not occurring.

FIG. 30 is a diagram illustrating, as an example, a projection image 151 projected to the door glass 101 of the front passenger seat 82 when vibration is not occurring.

The projection image 151 in FIG. 30 is a projection image projected to the door glass 101 in a case in which a screen is the door glass 101 of the front passenger seat 82.

Also, the door glass 101 is defined as a screen to have screen properties of the screen ID #S7 in the screen property table in FIG. 6. Therefore, when vibration occurs, the information presentation unit 35 performs processing of moving in parallel in accordance with graphical user interface (GUI) parts as projection images.

The projection image 151 is configured of a building information 152 (Tokyo Tower is 3 km ahead) displayed besides a building outside the automobile and a Tokyo weather widget 153.

Since the building information 152 is information belonging to (included in) a landscape when vibration occurs, the GUI parts move integrally with the outside landscape by moving the GUI parts in parallel in accordance with detected vibration.

The weather widget 153 is information attached to the window regardless of the landscape, the information does not move in parallel and vibrates together with the vehicle body even if vibration is detected.

In this manner, it is possible to prevent a user's mental model that the landscape seen at a further location does not shake while information attached to the window shakes from collapsing. Note that the modes 12 to 15 of the information presentation processing can be applied in combination of the modes 1 to 11.

(Mode 13)

Figure 31:
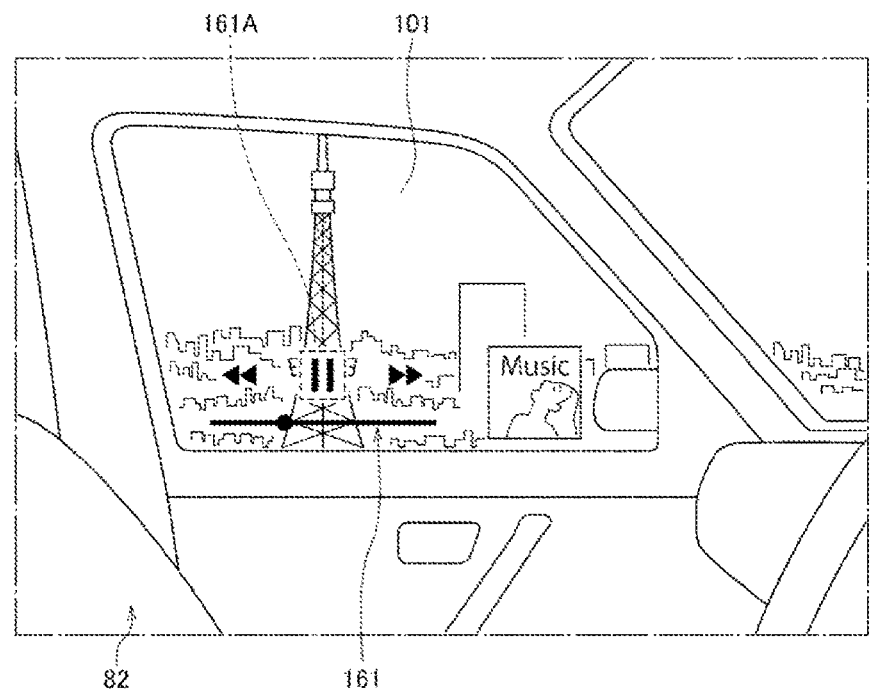
FIG. 31 is a diagram illustrating, as an example, a projection image 161 projected to the door glass 101 of the front passenger seat 82 when vibration is not occurring.

FIG. 31 is a diagram illustrating, as an example, a projection image 161 projected to the door glass 101 of the front passenger seat 82 when vibration is not occurring.

The projection image 161 in FIG. 31 has replayed image (replayed video) and a GUI button 161A for operations. In a case in which vibration occurs when a touch operation is about to be performed on the GUI button 161A or the like, a finger may slip out of the position of the GUI button 161A due to the vibration.

Figure 32:
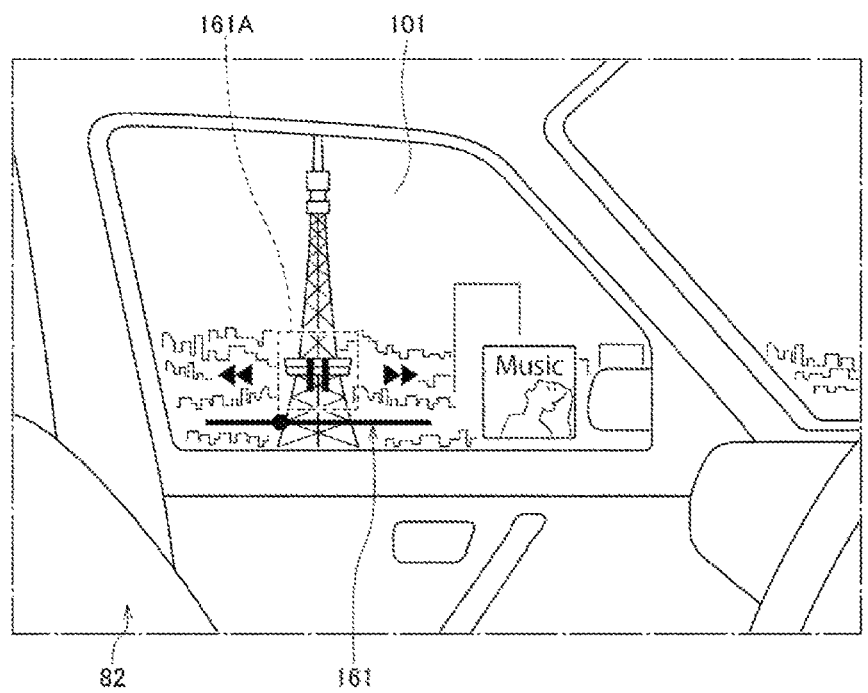
FIG. 32 is a diagram illustrating GUI parts when vibration occurs.

FIG. 32 is a diagram illustrating GUI parts when vibration occurs.

Since the size of the GUI parts has not been changed in FIG. 32, there are no difference in appearances in FIGS. 31 and 32, while a hit area (the range of the dashed line frame of the GUI button 161A) that is a range in which a touch operation on the GUI button 161A is effective has been enlarged as compared with the case in FIG. 31. In this manner, it is possible to perform a touch operation even if the finger slightly slips out of the GUI button 161A due to vibration.

(Mode 14)

Figure 33:
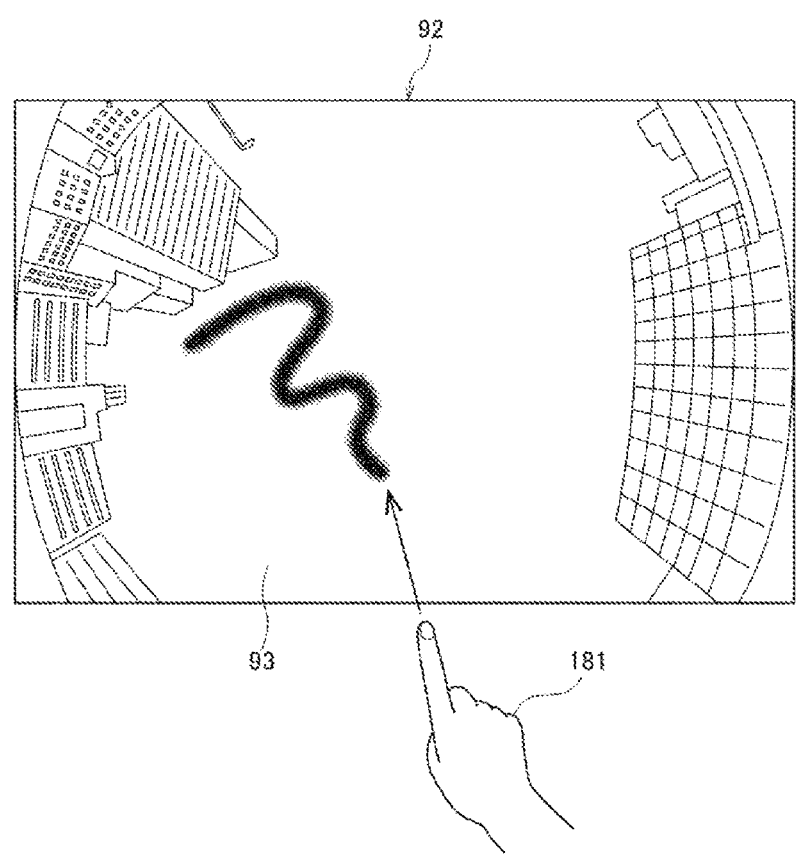
FIG. 33 is a diagram for explaining information presentation processing of preventing erroneous operations due to vibration.
Figure 34:
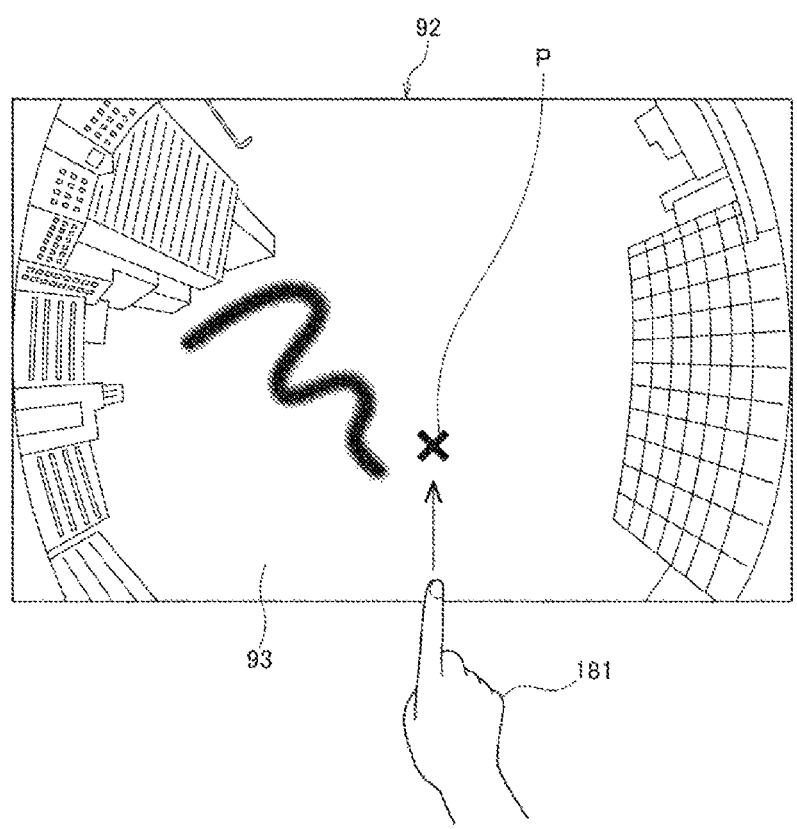
FIG. 34 is a diagram for explaining the information presentation processing of preventing erroneous operations due to vibration.

FIGS. 33 and 34 are diagrams for explaining information presentation processing of preventing an erroneous operation due to vibration.

A projection image 93 in FIGS. 33 and 34 is a projection image projected to the ceiling 92. If the user performs a dragging operation toward the projection image 93 with a finger 181, for example, then the graphics display processing unit 22 in FIG. 1, for example, detects the position (trace) at which the dragging operation is performed with the finger 181. When vibration occurs at that time, the graphics display processing unit 22 temporarily does not receive the operation.

FIG. 33 illustrates a state in which a line is depicted on the projection image 93 through the dragging operation with the finger 181. On the other hand, FIG. 34 illustrates a state in which vibration occurs and the dragging operation of the user is temporarily not received. In the example in FIG. 34, the dragging operation with the finger 181 is locked at the position of the point P for a predetermined period of time. It is thus possible to prevent an erroneous operation due to the vibration.

(Mode 15)

Figure 35:
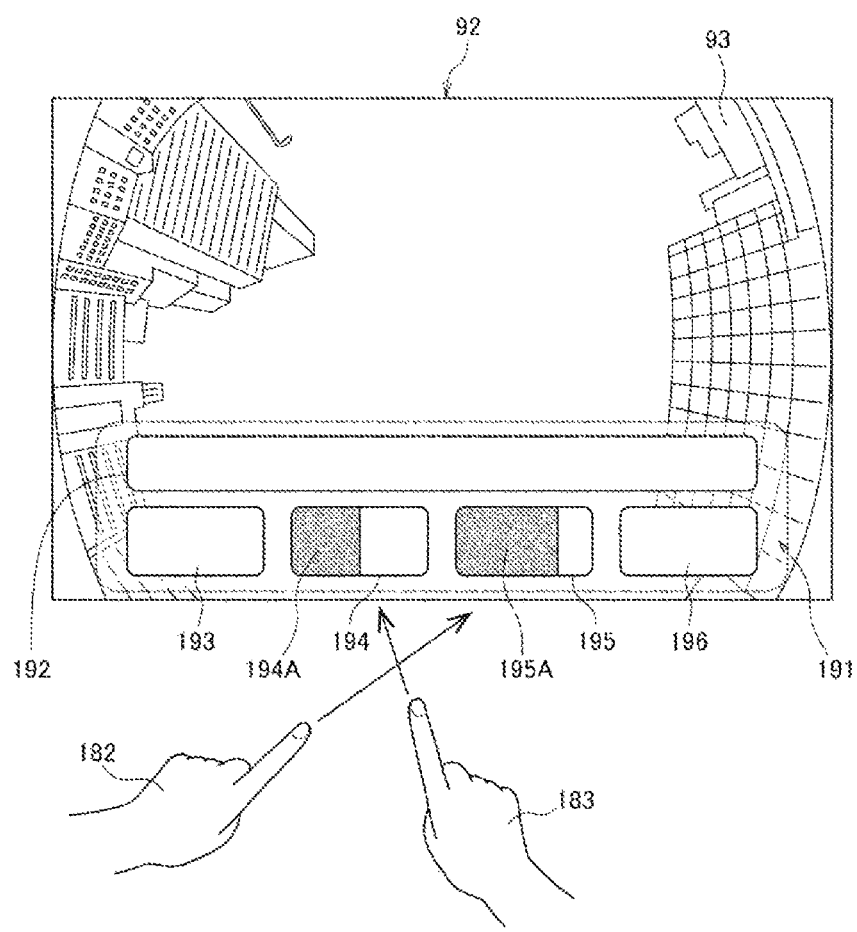
FIG. 35 is a diagram for explaining the information presentation processing of preventing erroneous operations due to vibration.
Figure 36:
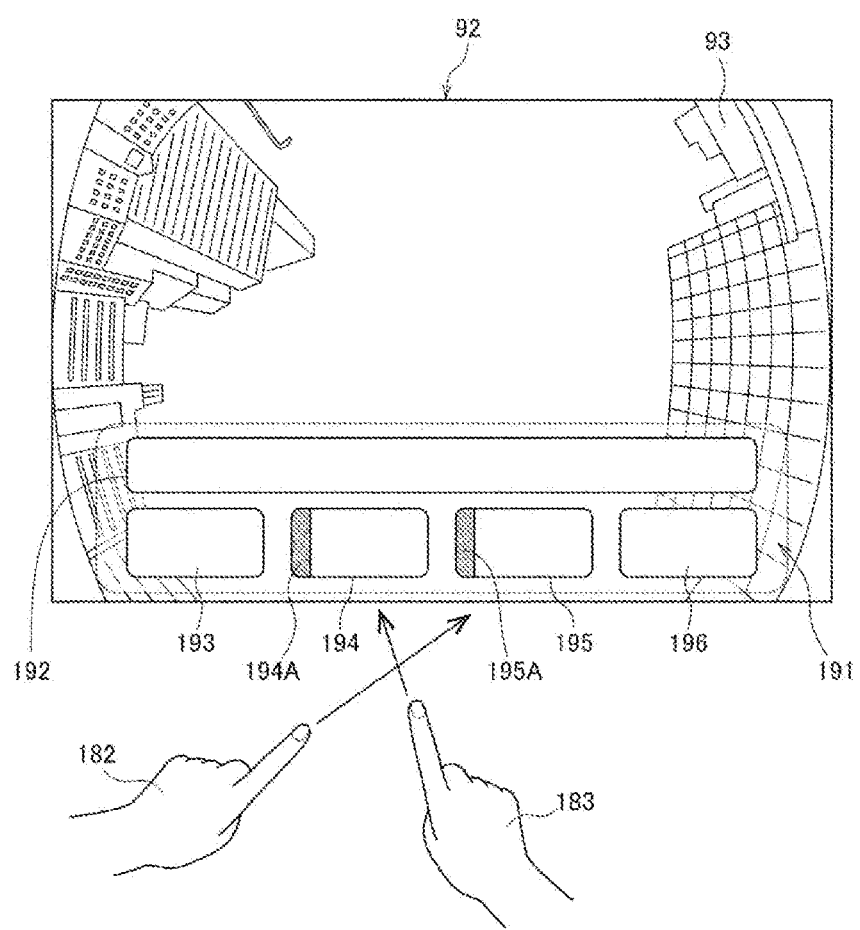
FIG. 36 is a diagram for explaining the information presentation processing of preventing erroneous operations due to vibration.

FIGS. 35 and 36 are diagrams for explaining information presentation processing of preventing an erroneous operation due to vibration.

A projection image 93 in FIGS. 35 and 36 is an image of an outside landscape projected to the ceiling 92 as a screen. A quiz image 191 is projected on the projection image 93 as a background. In the quiz image 191, a question area 192 where a question sentence (quiz) is displayed and selection buttons 193 to 196 for selecting an answer are displayed as GUI parts.

Selection of a button is completed by the user pointing the button that the user desires to select through a pointing gesture and continuing the pointing for a specific period of time. Also, how long the finger has been retained (how long the pointing has been continued) is displayed as a gauge, for example, on the selected button until the selection is completed after the pointing is started.

It is assumed that gauges 194A and 195A are retained at the selection buttons 194 and 195 as in FIG. 35 by operating such selection buttons of a retention meter type. In a case in which vibration occurs in this state, the gauges 194A and 195A retained at the selection buttons 194 and 195 are reset as in FIG. 36. It is thus possible to prevent erroneous decision due to vibration.

<Others>

Processing performed when information is projected to various locations in the vehicle interior 91 will be described.

Figure 37:
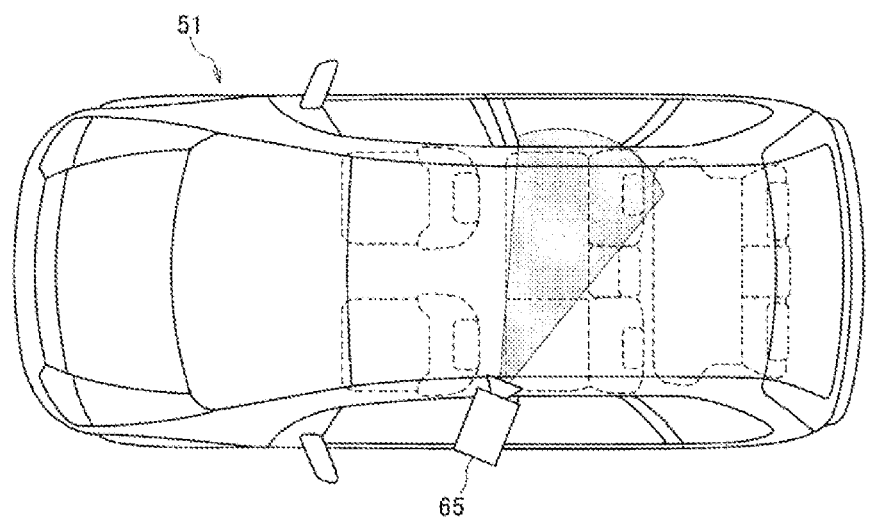
FIG. 37 is a diagram representing a position where a projector is placed and a projection location.

FIG. 37 is a diagram representing a placement location and a projection location of a projector.

The projector 65 in FIG. 37 is placed at a B pillar on the left side, for example. Also, a projection image from the projector is projected to the door glass of the right door of the rear seat.

Figure 38:
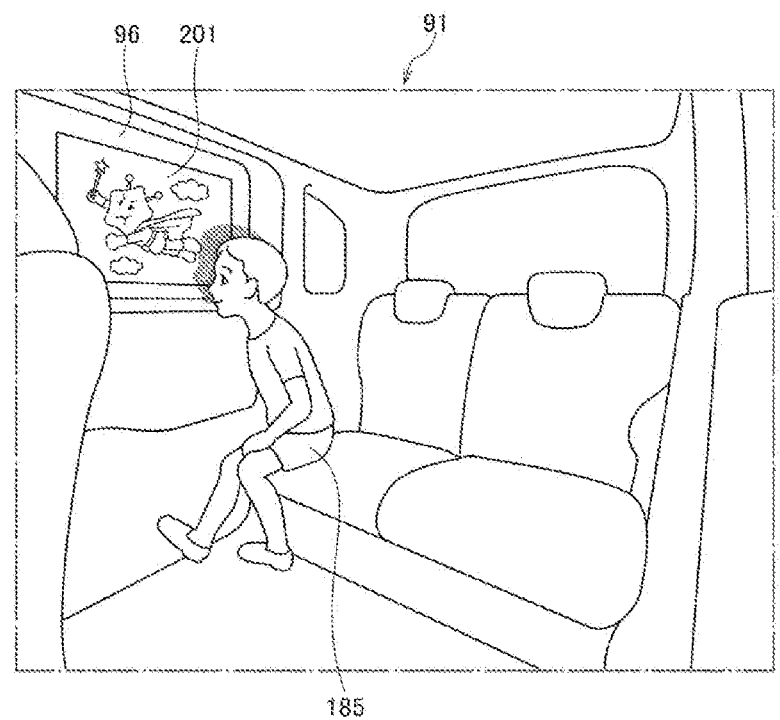
FIG. 38 is a diagram used for explaining a mode in which a shadow polygon is used.

FIG. 38 is a diagram representing how the vehicle interior 91 is like.

In FIG. 38, a projection image 201 from the projector 65 is projected to the right door glass 96 in the vehicle interior 91. Also, a user 185 who is a child is viewing the projection image 201 in FIG. 38.

Figure 39:
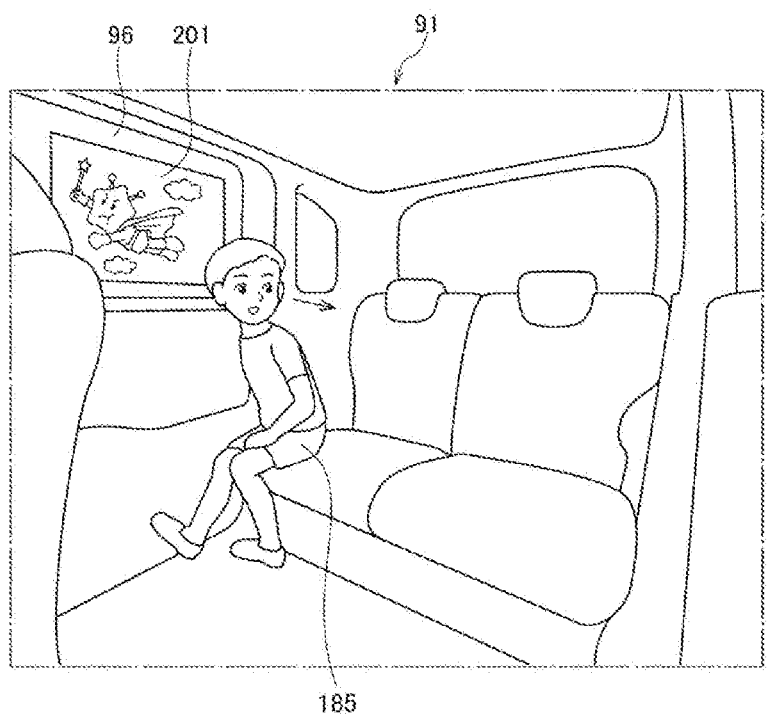
FIG. 39 is a diagram for explaining the mode in which the shadow polygon is used.

Although there is no problem in FIG. 38 because the user 185 is viewing the projection image 201 while facing the side of the projection image 201, there is a concern that light from the projector 65 enters the eyes if the user 185 turns his/her head around as in FIG. 39.

Figure 40:
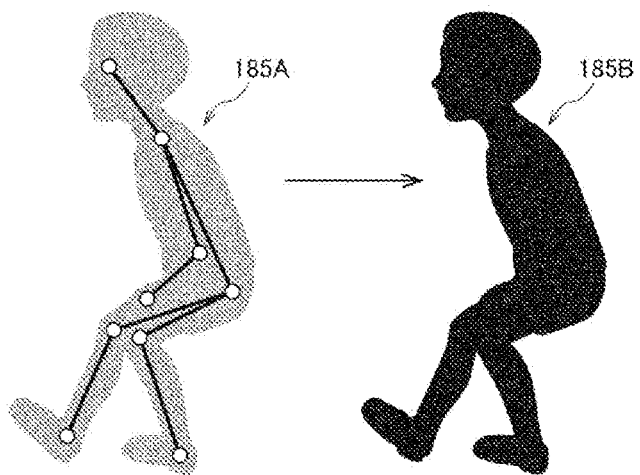
FIG. 40 is a diagram for explaining the mode in which the shadow polygon is used.

Thus, bone data 185A is generated first by sensing the body of the user 185 as illustrated in FIG. 40, and a shadow polygon 185B is generated by putting meat on the bone data 185A.

Figure 41:
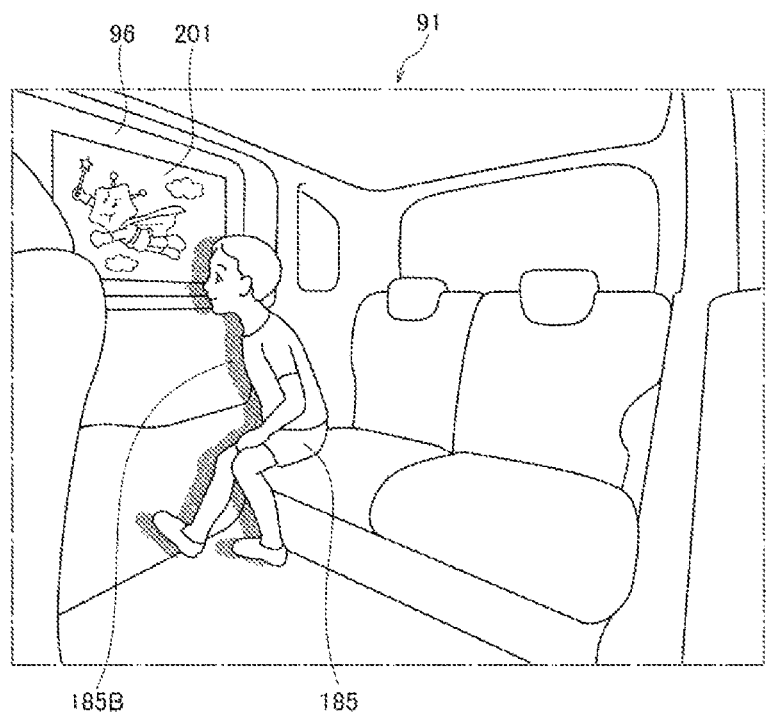
FIG. 41 is a diagram for explaining the mode in which the shadow polygon is used.

Next, the shadow polygon 185B as illustrated in FIG. 41 is projected to the user 185 such that the shadow polygon 185B overlaps the position of the user 185.

Then, the shadow polygon 185B is projected to the position of the user 185 in real time in accordance with motions of the user 185.

Figure 42:
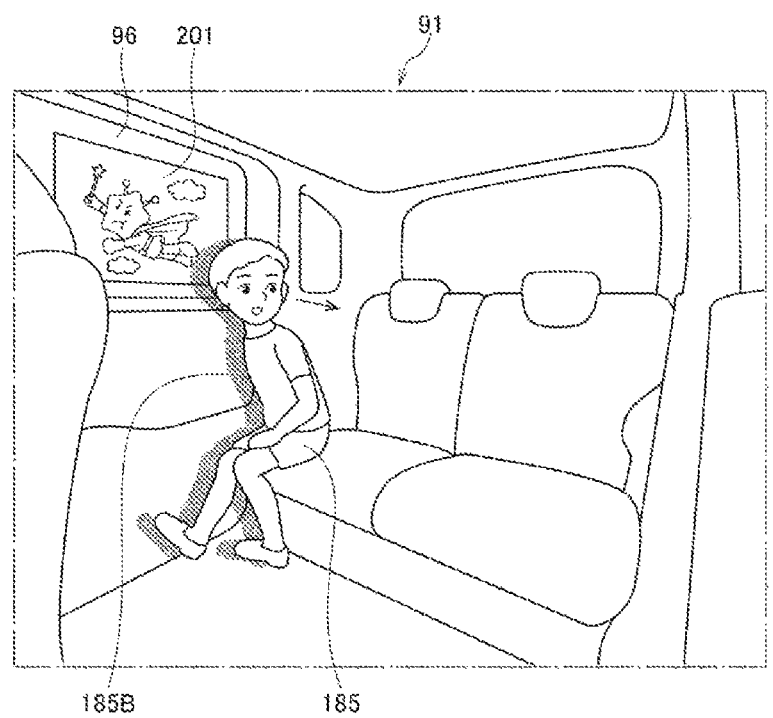
FIG. 42 is a diagram for explaining the mode in which the shadow polygon is used.

In this manner, the shadow polygon 185B is constantly superimposed on the body, and it is thus possible to prevent the projection image 201 from being projected to the body even if the user 185 enters the projection range of the projector 65 as illustrated in FIG. 42. It is possible to prevent the user from feeling too bright when he/she suddenly turns his/her head around and to prevent the projection image 201 from being superimposed on the body and causing an uncomfortable appearance in advance, by not projecting the projection image 201 to the body.

Figure 43:
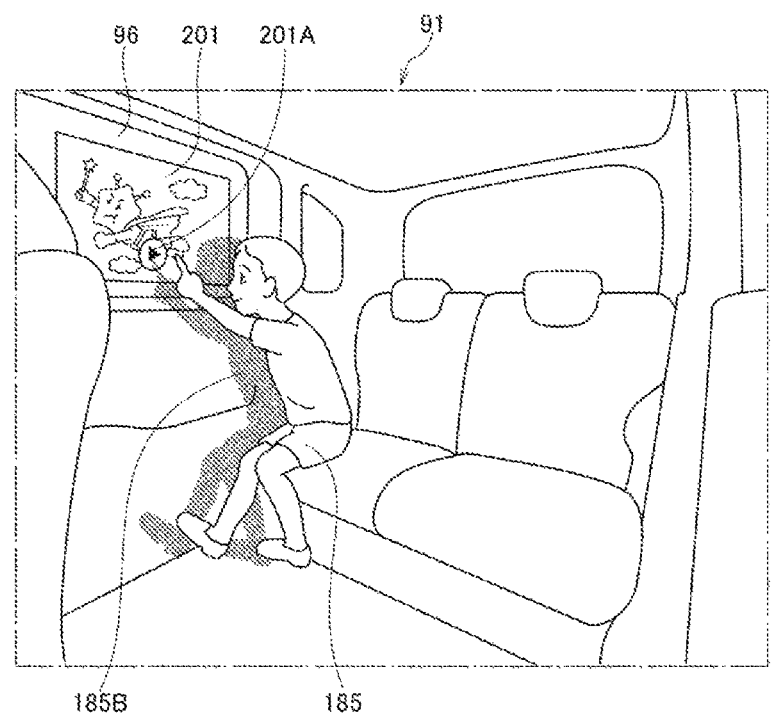
FIG. 43 is a diagram for explaining the mode in which the shadow polygon is used.

Note that it is also possible to perform an operation on a GUI (such as a GUI button 201A) using a silhouette (shadow polygon 185B) without approaching the projection surface, using the bone data 185A as illustrated in FIG. 43.

Figure 44:
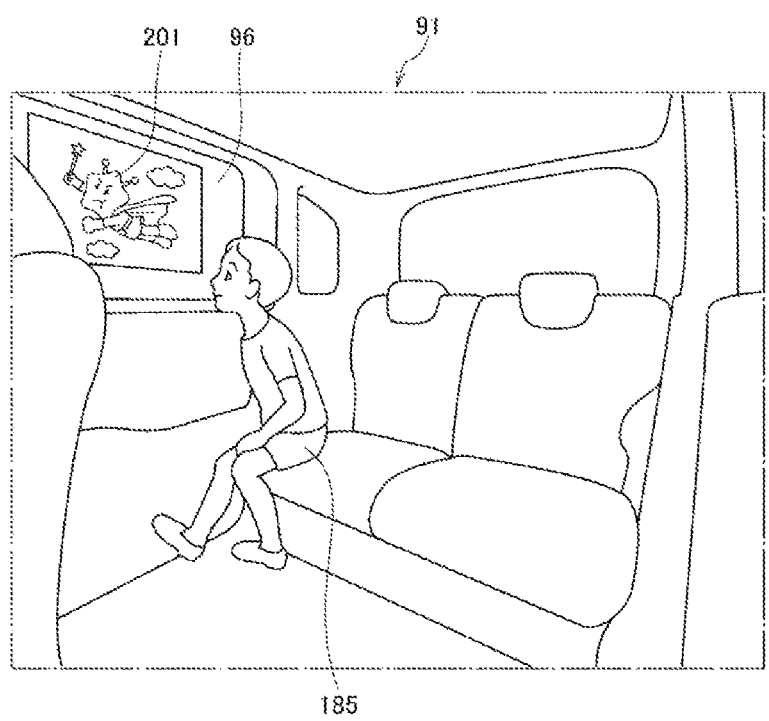
FIG. 44 is a diagram used for explaining a mode in which an available range inside a projection plane is dynamically controlled.

Also, projection to body may be avoided by dynamically controlling the available range inside the projection surface in accordance with motions of the user 185 and moving and reducing the application window as illustrated in FIG. 44.

<Program>

A part or an entirety of the processing performed by the information processing device 11 can be executed by hardware or can be executed by software. In a case in which the series of processing is performed by software, a program including the software is installed in a computer. Here, the computer includes, for example, a computer built into dedicated hardware, a general-purpose personal computer that can execute various functions through installation of various programs.

Figure 45:
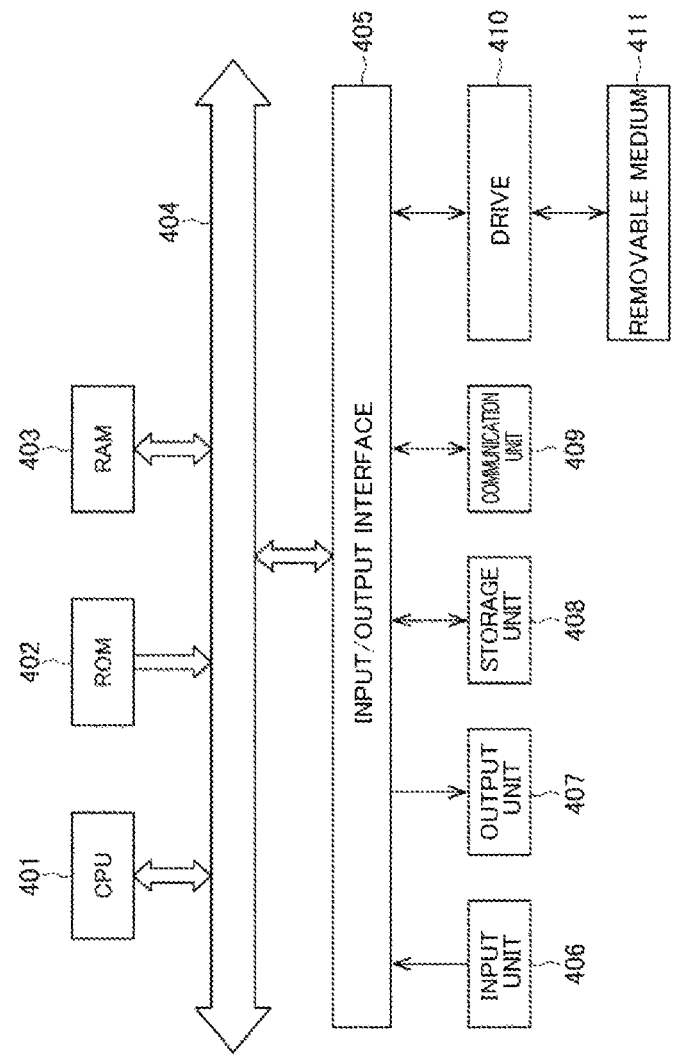
FIG. 45 is a block diagram illustrating a configuration example of hardware of a computer.

FIG. 45 is a block diagram illustrating a configuration example of hardware of a computer that executes the aforementioned series of processing using a program.

In the computer, a central processing unit (CPU) 401, a read-only memory (ROM) 402, and a random access memory (RAM) 403 are connected to each other by a bus 404.

An input/output interface 405 is further connected to the bus 404. An input unit 406, an output unit 407, a storage unit 408, a communication unit 409, and a drive 410 are connected to the input/output interface 405.

The input unit 406 is constituted by a keyboard, a mouse, a microphone, or the like. The output unit 407 is a display, a speaker, or the like. The storage unit 408 is constituted by a hard disk, a non-volatile memory, or the like. The communication unit 409 is a network interface or the like. The drive 410 drives a removable medium 411 such as a magnetic disk, an optical disc, a magneto-optical disk, or a semiconductor memory.

In the computer that has the foregoing configuration, the CPU 401 performs the above-described series of processing, for example, by loading a program stored in the storage unit 608 on the RAM 403 via the input/output interface 405 and the bus 404 and executing the program.

The program executed by the computer (the CPU 401) can be recorded on and provided as, for example, the removable medium 411 serving as a package medium. The program can be provided via a wired or wireless transfer medium such as a local area network, the Internet, or digital satellite broadcasting.

In the computer, by mounting the removable medium 411 on the drive 410, it is possible to install the program in the storage unit 408 via the input/output interface 405. The program can be received by the communication unit 409 via a wired or wireless transfer medium and can be installed in the storage unit 408. In addition, the program can be installed in advance in the ROM 402 or the storage unit 408.

Note that the program executed by a computer may be a program that performs processing chronologically in the order described in the present specification or may be a program that performs processing in parallel or at a necessary timing such as a called time.

The present technology can also be configured as follows.

(1) An information processing device including: a presentation processing unit that changes, on the basis of vibration information, at least one of parameters of brightness, blur, area, and transparency as a parameter related to presentation information to be presented in a vehicle interior of a vehicle.

(2) The information processing device according to (1), in which the presentation processing unit changes the parameter associated with a presentation location where the presentation information is to be presented.

(3) The information processing device according to (2), in which attributes of the presentation location include a ceiling, a headrest, and a window in the vehicle interior.

(4) The information processing device according to (2), in which the presentation processing unit changes a value of the parameter in accordance with attributes of a user who is viewing the presentation information.

(5) The information processing device according to claim 4), in which the attributes of the user include a race, adult/child, and a seated position of the user.

(6) The information processing device according to (5), in which a value of the parameter is defined for each of the attributes of the user.

(7) The information processing device according to (6), in which in a case where a single user is viewing the presentation information, the presentation processing unit uses values of the parameters defined for the attributes of the user as values of the parameters related to the presentation information.

(8) The information processing device according to (6), in which in a case where a plurality of users are viewing a single piece of the presentation information, the presentation processing unit uses a maximum value or a minimum value of the values defined for each of the attributes of the users as a value of the parameter related to the presentation information.

(9) The information processing device according to (8), in which in a case where the parameter is brightness, the presentation processing unit uses a minimum value of the values defined for each of the attributes of the users as a value of brightness related to the presentation information.

(10) The information processing device according to (8), in which in a case where the parameter is blur, the presentation processing unit uses a maximum value of the values defined for each of the attributes of the users as a value of blur related to the presentation information.

(11) The information processing device according to (8), in which in a case where the parameter is area, the presentation processing unit uses a minimum value of the values defined for each of the attributes of the users as a value of area related to the presentation information.

(12) The information processing device according to (8), in which in a case where the parameter is transparency, the presentation processing unit uses a maximum value of the values defined for each of the attributes of the users as a value of transparency related to the presentation information.

(13) The information processing device according to any one of (1) to (12), in which the presentation processing unit changes the parameter on the basis of whether or not there is vibration of the vehicle that is currently traveling.

(14) The information processing device according to any one of (1) to (12), in which the presentation processing unit changes the parameter on the basis of whether or not there is vibration of the vehicle that is expected to be detected in the future.

(15) The information processing device according to (14), in which in a case where vibration of the vehicle is expected to be detected in the future, the presentation processing unit gradually changes the parameter until the vibration of the vehicle is detected.

(16) The information processing device according to any one of (1) to (15), in which the presentation information is a projection image.

(17) The information processing device according to (1), in which the presentation information is GUI parts, and the presentation processing unit causes the GUI parts to move in parallel at a presentation location where the GUI parts are presented, on the basis of the vibration information.

(18) The information processing device according to (1), in which the presentation information is GUI parts, and the presentation information causes a range where operations on the GUI parts are effective to change on the basis of the vibration information.

(19) An information processing method including: by a processing unit of an information processing device that includes the processing unit, changing, on the basis of vibration information, at least one of parameters of brightness, blur, area, and transparency as a parameter related to presentation information to be presented in a vehicle interior of a vehicle.

(20) A program that causes a computer to function as a presentation processing unit that changes, on the basis of vibration information, at least one of parameters of brightness, blur, area, and transparency as a parameter related to presentation information to be presented in a vehicle interior of a vehicle.

REFERENCE SIGNS LIST

11 Information processing device
21 Input unit
22 Graphics display processing unit
23 Output unit
24 Presentation processing unit
31 Vehicle state detection unit
32 Vibration detection unit
33 Screen property definition unit
34 User property definition unit
35 Information presentation unit

The invention claimed is:

1. An information processing device, comprising:
a central processing unit (CPU) configured to:
acquire vibration information based on a vibration of an interior of a vehicle;
acquire a set of images including a set of users seated in the interior of the vehicle;
detect a number of users in the set of users and a gaze direction of each user of the set of users, based on the acquired set of images;
detect a target screen of a set of screens in the interior of the vehicle, wherein
the detected target screen is associated with a first presentation location in the interior of the vehicle, and
the detection of the target screen is based on the detected number of users and the gaze direction;
determine a set of parameters related to presentation information, wherein
the determination of the set of parameters is based on the acquired vibration information and the first presentation location, and
the determined set of parameters includes at least one of brightness, blur, area, or transparency; and
control rendering of the presentation information on the detected target screen in the interior of the vehicle, based on the determined set of parameters.

2. The information processing device according to claim 1, wherein attributes of the first presentation location includes a ceiling, a headrest, and a window in the vehicle interior.

3. The information processing device according to claim 1, wherein the CPU is further configured to update a first value of a first parameter of the determined set of parameters based on attributes of a first user of the set of users who is viewing the presentation information.

4. The information processing device according to claim 3, wherein the attributes of the first user include a race, adult/child, and a seated position of the first user.

5. The information processing device according to claim 4, wherein the first value of the first parameter of the determined set of parameters is defined for each attribute of the attributes of the first user.

6. The information processing device according to claim 5, wherein
the set of users corresponds to a single user including the first user, and
the CPU is further configured to assign the first value of the first parameter of the determined set of parameters defined for each attribute of the attributes of the first user as a second value of the determined set of parameters related to the presentation information.

7. The information processing device according to claim 5, wherein
the set of users corresponds to a plurality of users including the first user, and
the CPU is further configured to assign a maximum value or a minimum value of the first value defined for each attribute of the attributes of the plurality of users as a second value of the determined set of parameters related to the presentation information.

8. The information processing device according to claim 7, wherein
the first parameter of the set of parameters corresponds to the brightness, and
the CPU is further configured to assign a minimum value of the first value defined for each attribute of the attributes of the plurality of users as a third value of the brightness related to the presentation information.

9. The information processing device according to claim 7, wherein
the first parameter of the set of parameters corresponds to the blur, and the CPU is further configured to assign a maximum value of the first value defined for each attribute of the attributes of the plurality of users as a third value of the blur related to the presentation information.

10. The information processing device according to claim 7, wherein
the first parameter of the set of parameters corresponds to the area, and
the CPU is further configured to assign a minimum value of the first value defined for each attribute of the attributes of the plurality of users as a third value of the area related to the presentation information.

11. The information processing device according to claim 7, wherein
the first parameter of the set of parameters corresponds to the transparency, and
the CPU is further configured to assign a maximum value of the first value defined for each attribute of the attributes of the plurality of users as a third value of the transparency related to the presentation information.

12. The information processing device according to claim 1, wherein the CPU is further configured to update the determined set of parameters based on of whether or not vibration of the vehicle that is currently traveling is detected.

13. The information processing device according to claim 1, wherein the CPU is further configured to update the determined set of parameters based on the basis of whether or not there is-vibration of the vehicle is predicted to be detected at a future time.

14. The information processing device according to claim 13, wherein the CPU is further configured to gradually update the determined set of parameters until the vibration of the vehicle is detected.

15. The information processing device according to claim 1, wherein the presentation information is a projection image.

16. The information processing device according to claim 1, wherein
the presentation information corresponds to GUI parts presented at a second presentation location, and
the CPU is further configured to control the GUI parts to move in parallel at the second presentation location, based on the vibration information.

17. The information processing device according to claim 1, wherein
the presentation information corresponds to GUI parts associated with a range in which a touch operation of a first user is configured to be performed, and
the CPU is further configured to control the range associated with the GUI parts, based on the vibration information.

18. An information processing method, comprising:
by a central processing unit (CPU) of an information processing device;
acquiring vibration information, based on a vibration of an interior of a vehicle;
acquiring a set of images including a set of users seated in the interior of the vehicle;
detecting a number of users in the set of users and a gaze direction of each user of the set of users, based on the acquired set of images;
detecting a target screen of a set of screens in the interior of the vehicle, wherein
the detected target screen is associated with a first presentation location in the interior of the vehicle, and
the detection of the target screen is based on the detected number of users and the gaze direction;
determining a set of parameters related to presentation information, wherein
the determination of the set of parameters is based on the acquired vibration information and the first presentation location, and
the determined set of parameters includes at least one of brightness, blur, area, or transparency; and
controlling rendering of the presentation information on the detected target screen in the interior of the vehicle, based on the determined set of parameters.

19. A non-transitory computer-readable medium having stored thereon, computer-executable instructions that when executed by an information processing device, causes the information processing device to execute operations, the operations comprising:
acquiring vibration information, based on a vibration of an interior of a vehicle;
acquiring a set of images including a set of users seated in the interior of the vehicle;
detecting a number of users in the set of users and a gaze direction of each user of the set of users, based on the acquired set of images;
detecting a target screen of a set of screens in the interior of the vehicle, wherein
the detected target screen is associated with a first presentation location in the interior of the vehicle, and
the detection of the target screen is based on the detected number of users and the gaze direction;
determining a set of parameters related to presentation information, wherein
the determination of the set of parameters is based on the acquired vibration information and the first presentation location, and
the determined set of parameters includes at least one of brightness, blur, area, or transparency; and
controlling rendering of the presentation information on the detected target screen in the interior of the vehicle, based on the determined set of parameters.

* * * * *